US010528825B2

(12) United States Patent
Oba

(10) Patent No.: US 10,528,825 B2
(45) Date of Patent: Jan. 7, 2020

(54) INFORMATION PROCESSING DEVICE, APPROACHING OBJECT NOTIFICATION METHOD, AND PROGRAM

(71) Applicant: Sony Corporation, Tokyo (JP)

(72) Inventor: Eiji Oba, Tokyo (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 14/893,997

(22) PCT Filed: May 28, 2014

(86) PCT No.: PCT/JP2014/002836
§ 371 (c)(1),
(2) Date: Nov. 25, 2015

(87) PCT Pub. No.: WO2014/196171
PCT Pub. Date: Dec. 11, 2014

(65) Prior Publication Data
US 2016/0110618 A1    Apr. 21, 2016

(30) Foreign Application Priority Data
Jun. 7, 2013    (JP) .................................. 2013-120600

(51) Int. Cl.
H04N 7/18    (2006.01)
G06K 9/00    (2006.01)
(Continued)

(52) U.S. Cl.
CPC ............ *G06K 9/00805* (2013.01); *B60R 1/00* (2013.01); *G06K 9/00845* (2013.01);
(Continued)

(58) Field of Classification Search
USPC .................................................. 348/148–149
See application file for complete search history.

(56) References Cited

U.S. PATENT DOCUMENTS

2002/0149673 A1    10/2002    Hirama et al.
2011/0140919 A1*    6/2011    Hara ........................ B60Q 1/50
                                                                    340/907

(Continued)

FOREIGN PATENT DOCUMENTS

CN    1460375 A    12/2003
JP    2002-183898 A    6/2002
(Continued)

OTHER PUBLICATIONS

Chinese Office Action dated Aug. 3, 2018 in connection with Chinese Application No. 201480030492.7, and English translation thereof.

(Continued)

*Primary Examiner* — Nigar Chowdhury
(74) *Attorney, Agent, or Firm* — Wolf, Greenfield & Sacks, P.C.

(57) ABSTRACT

There is provided a system including at least one image capturing device configured to capture an image of an object from a vehicle, and at least one display device configured to display the image of the object to an occupant of the vehicle. The system further includes at least one control unit configured to determine whether to alert the occupant to proximity of the object, and in response to determining to alert the occupant to proximity of the object, superimpose, on the image of the object for display on the at least one display device, a moving pattern through which the image of the object remains visible.

22 Claims, 12 Drawing Sheets

(51) Int. Cl.
  *G08G 1/16* (2006.01)
  *B60R 1/00* (2006.01)
  *G06K 9/62* (2006.01)
  *G06T 7/20* (2017.01)
  *G06T 11/60* (2006.01)
(52) U.S. Cl.
  CPC .............. *G06K 9/6215* (2013.01); *G06T 7/20* (2013.01); *G06T 11/60* (2013.01); *G08G 1/166* (2013.01); *B60R 2300/8093* (2013.01); *G06T 2207/30261* (2013.01); *G06T 2207/30268* (2013.01)

(56) References Cited

U.S. PATENT DOCUMENTS

| | | | | |
|---|---|---|---|---|
| 2011/0199197 | A1* | 8/2011 | Takatsudo | B60R 1/00 340/425.5 |
| 2012/0140080 | A1* | 6/2012 | Taylor | B60C 23/0408 348/148 |
| 2012/0314074 | A1* | 12/2012 | Aimura | G06K 9/00362 348/148 |
| 2012/0320212 | A1* | 12/2012 | Aimura | B60R 1/00 348/148 |
| 2013/0129149 | A1* | 5/2013 | Nandakumar | G06Q 30/0276 382/104 |

FOREIGN PATENT DOCUMENTS

| | | |
|---|---|---|
| JP | 2004-274538 A | 9/2004 |
| JP | 2007-124097 A | 5/2007 |
| JP | 2007-172540 A | 7/2007 |
| JP | 2008-193339 A | 8/2008 |
| JP | 2009-140305 A | 6/2009 |
| JP | 2010/126135 A | 6/2010 |
| JP | 2011-118482 A | 6/2011 |
| JP | 2011-134103 A | 7/2011 |
| JP | 2013-017024 A | 1/2013 |
| WO | WO 2013/046408 A1 | 4/2013 |
| WO | WO 2013/065325 A | 5/2013 |

OTHER PUBLICATIONS

Japanese Office Action dated Aug. 7, 2018 in connection with Japanese Application No. 2017-205795, and English translation thereof.
International Search Report and Written Opinion dated Sep. 4, 2014 in connection with International Application No. PCT/JP2014/002836.
International Preliminary Report on Patentability dated Dec. 17, 2015 in connection with International Application No. PCT/JP2014/002836.
Japanese Office Action dated Feb. 14, 2017 in connection with Japanese Application No. 2013-120600, and English translation thereof.
Japanese Office Action dated Feb. 5, 2019 in connection with Japanese Application No. 2017-205795, and English translation thereof.
Extended European Search Report dated Sep. 2, 2019 in connection with European Application No. 19186958.5.

* cited by examiner

[Fig. 1]
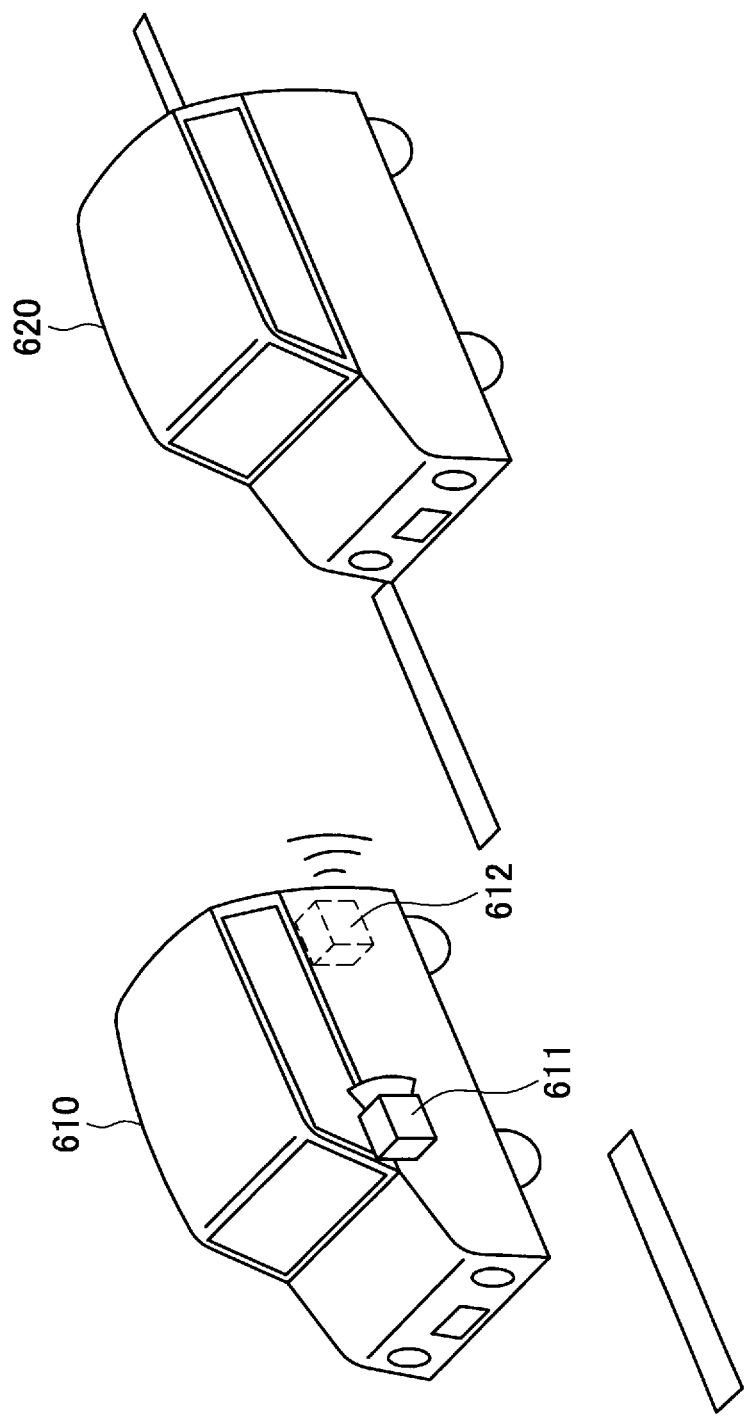

[Fig. 2]
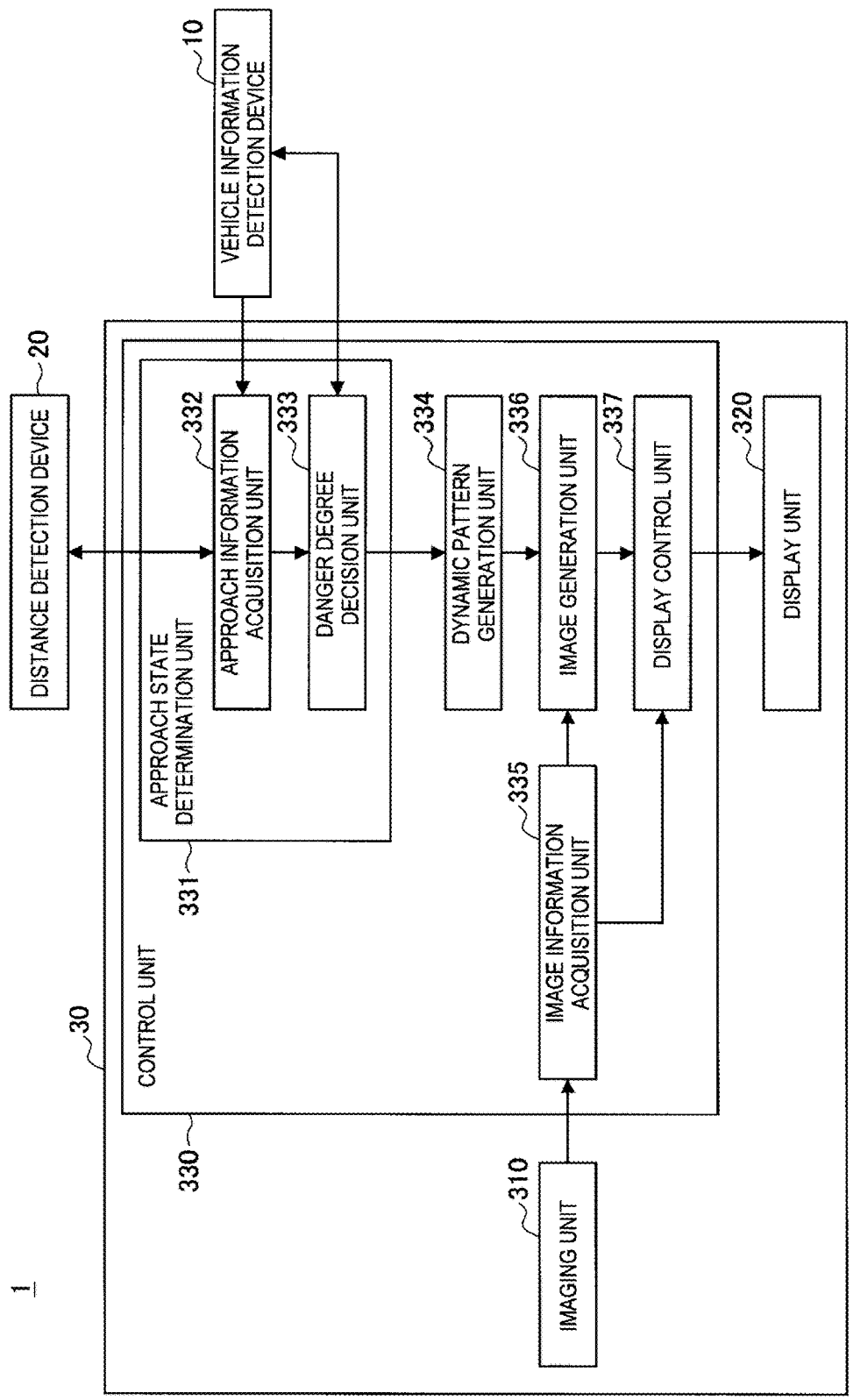

[Fig. 3A]
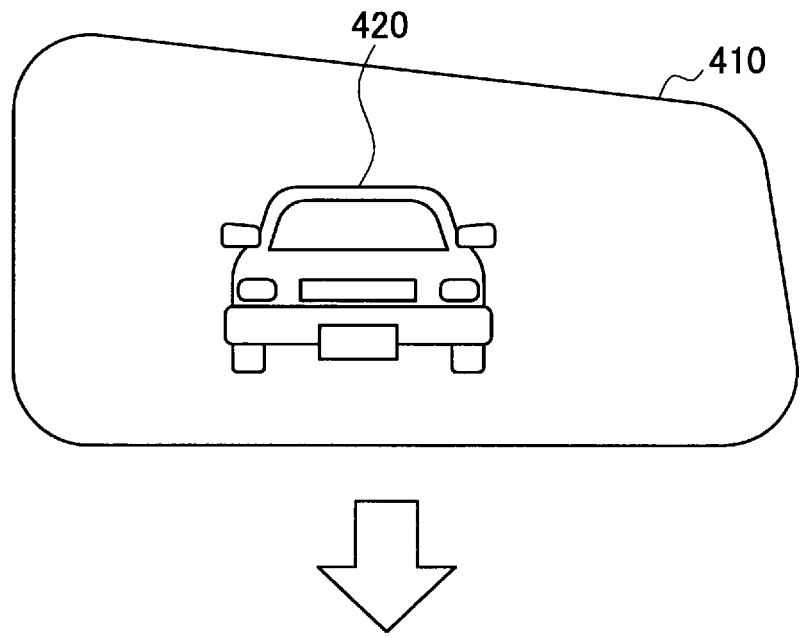
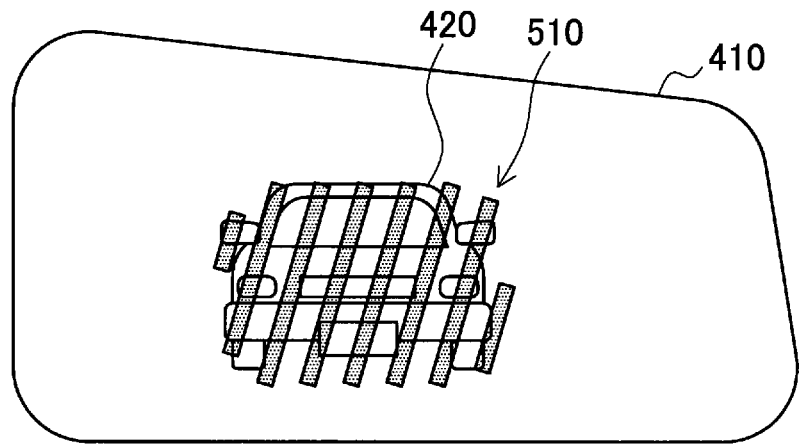

[Fig. 3B]
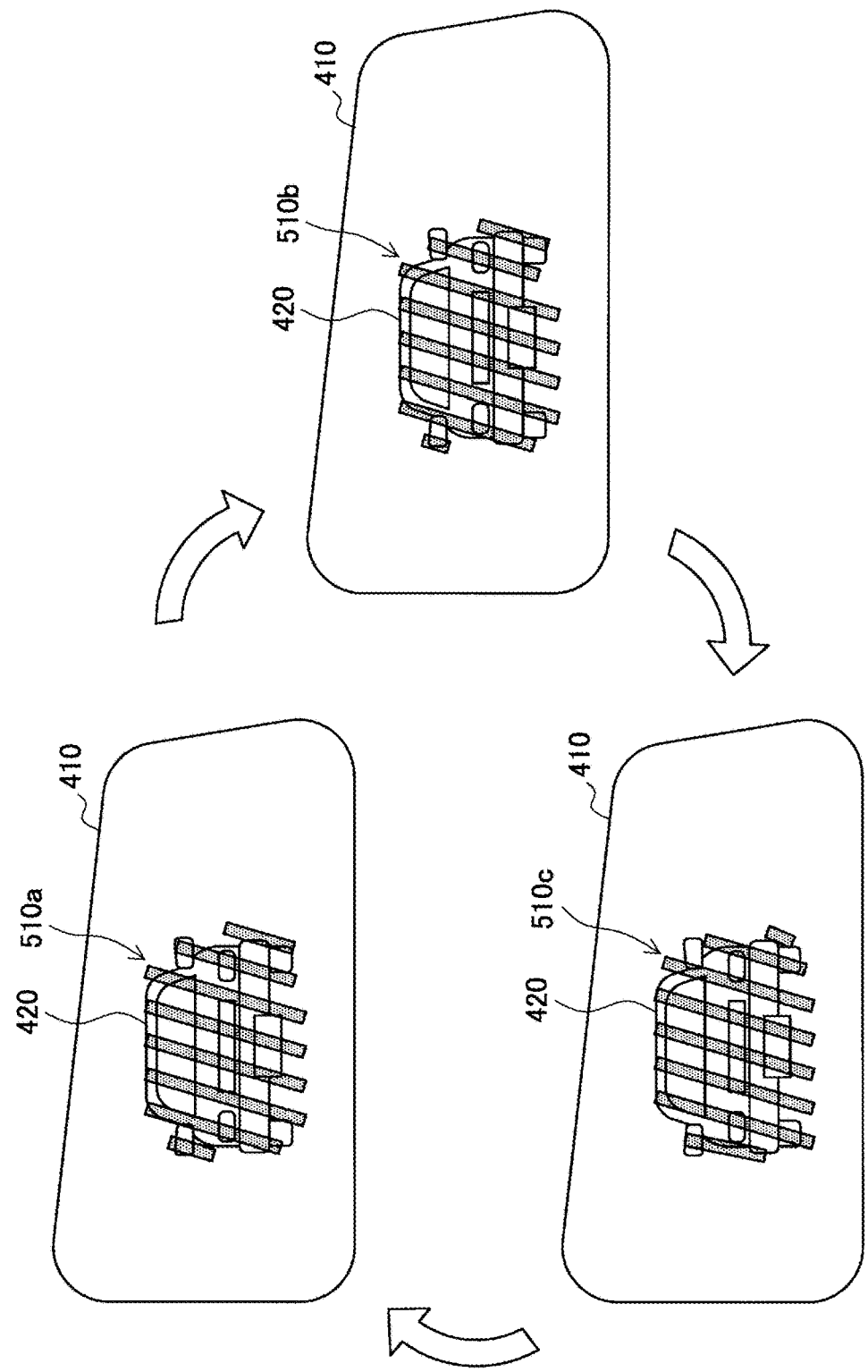

[Fig. 4A]
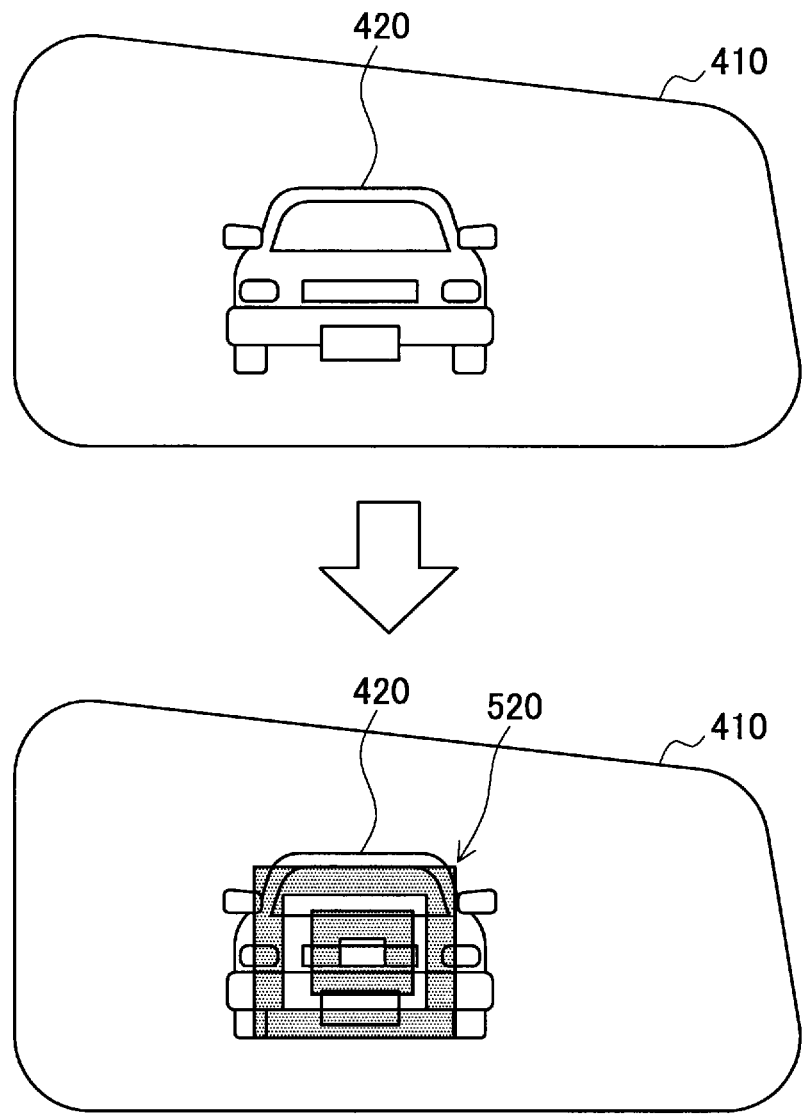

[Fig. 4B]
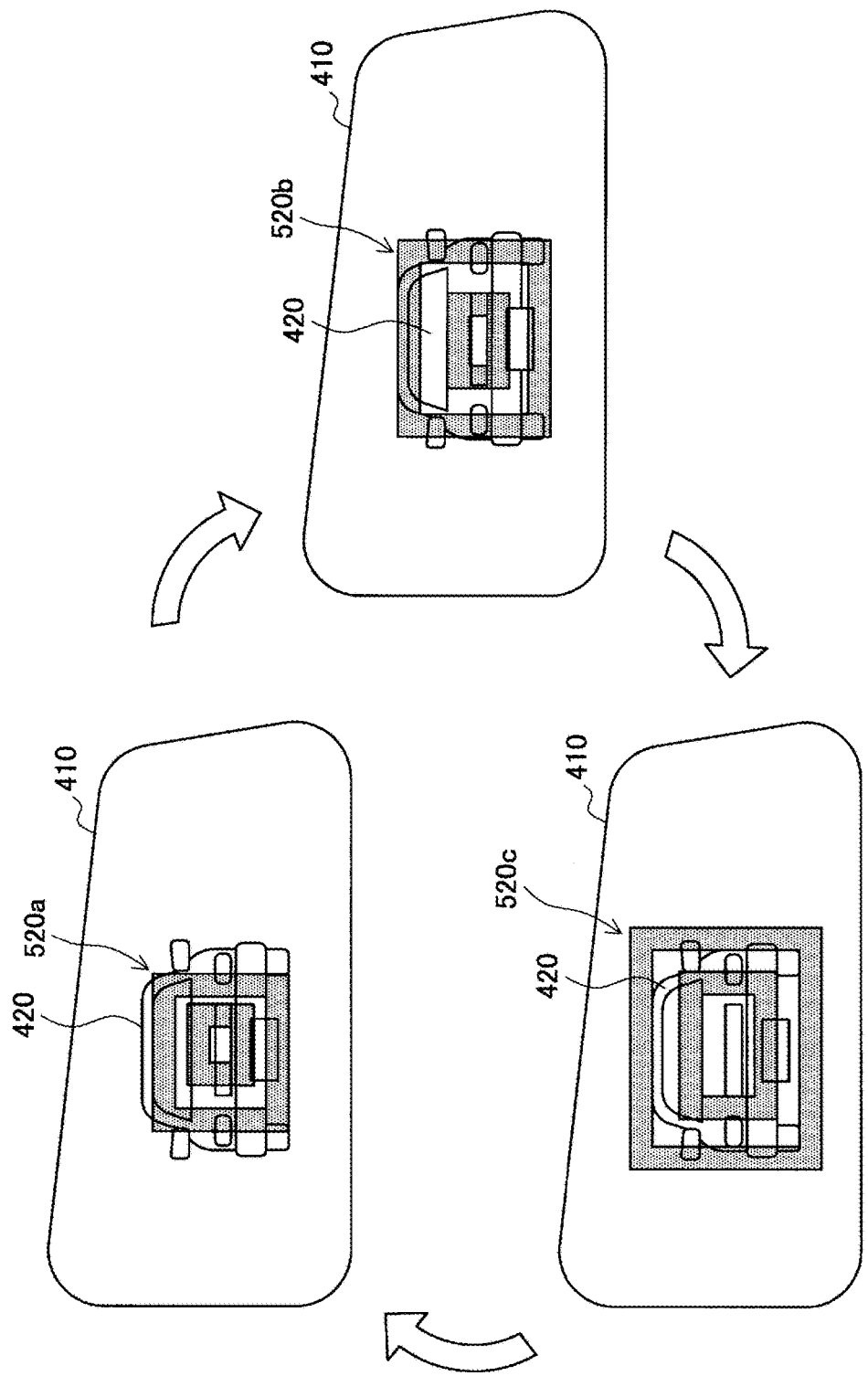

[Fig. 5A]
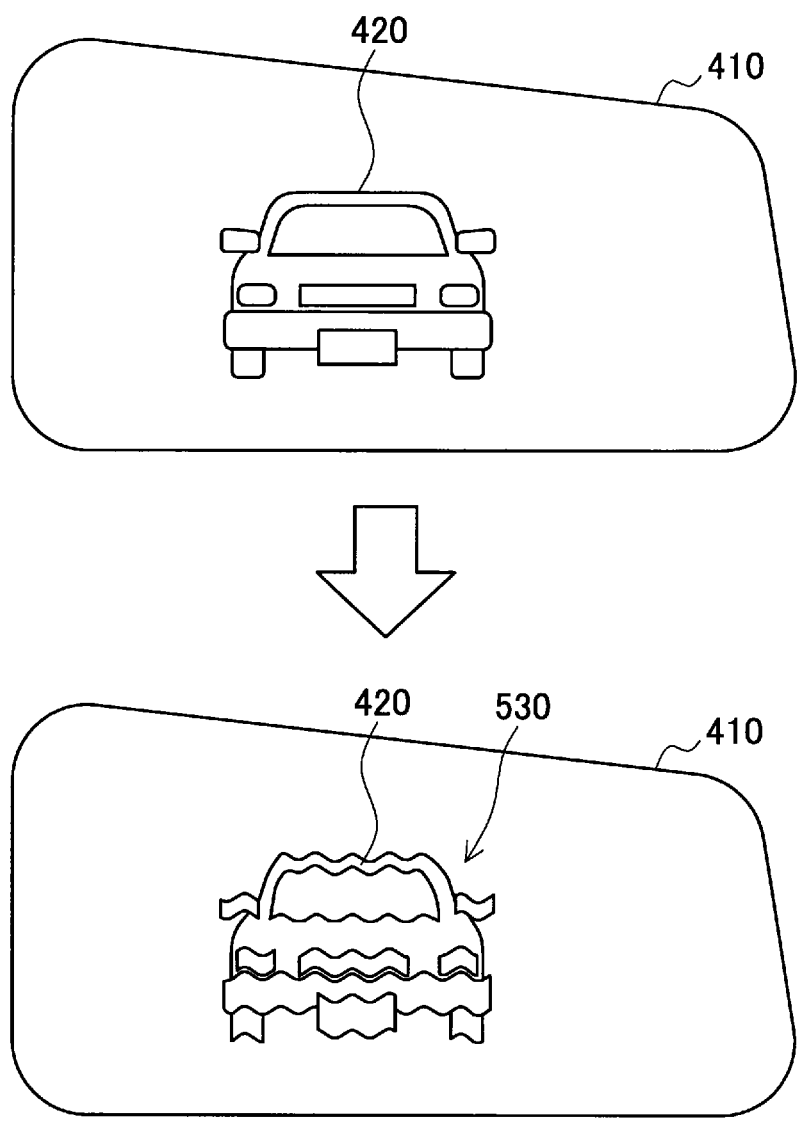

[Fig. 5B]
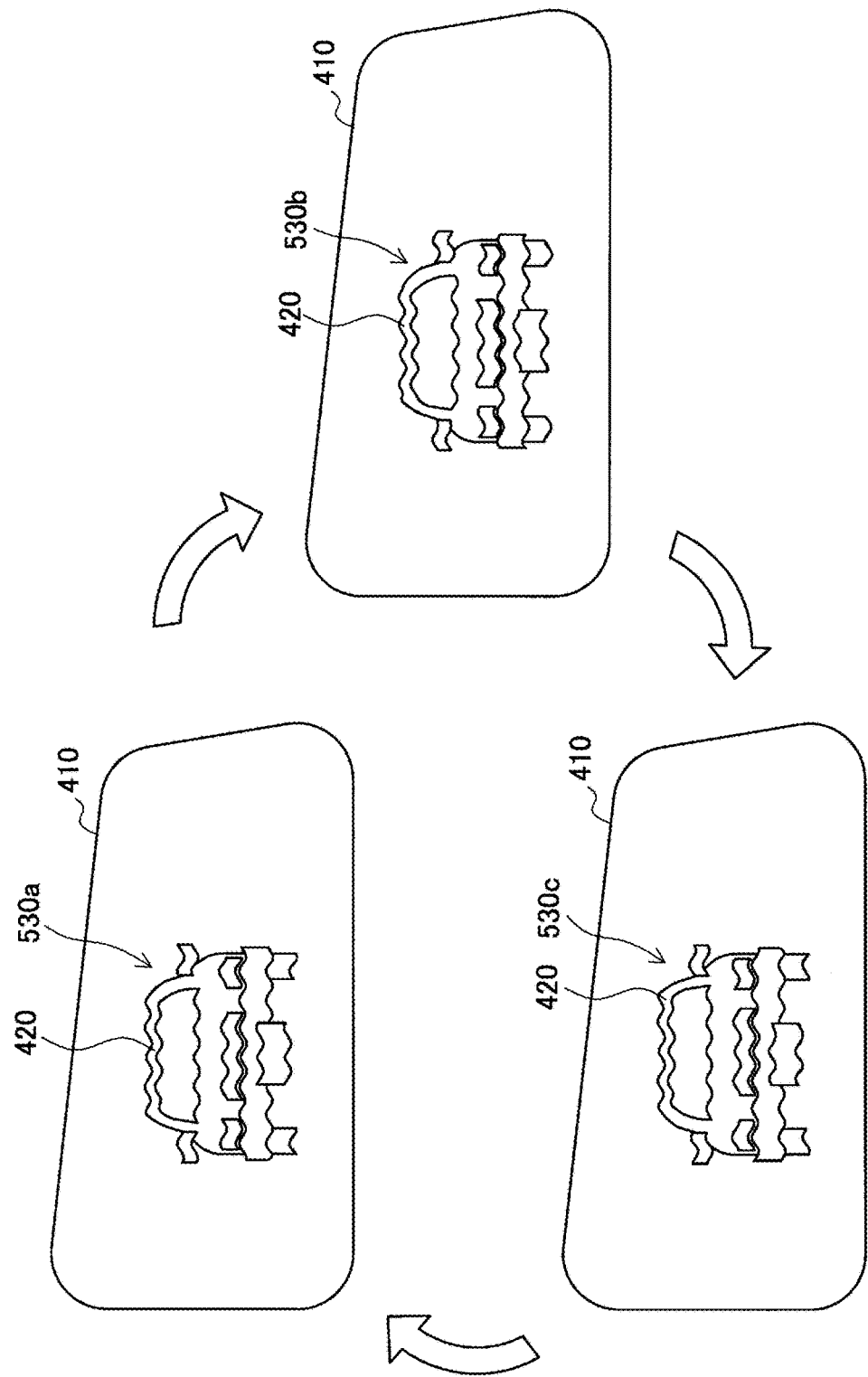

[Fig. 5C]
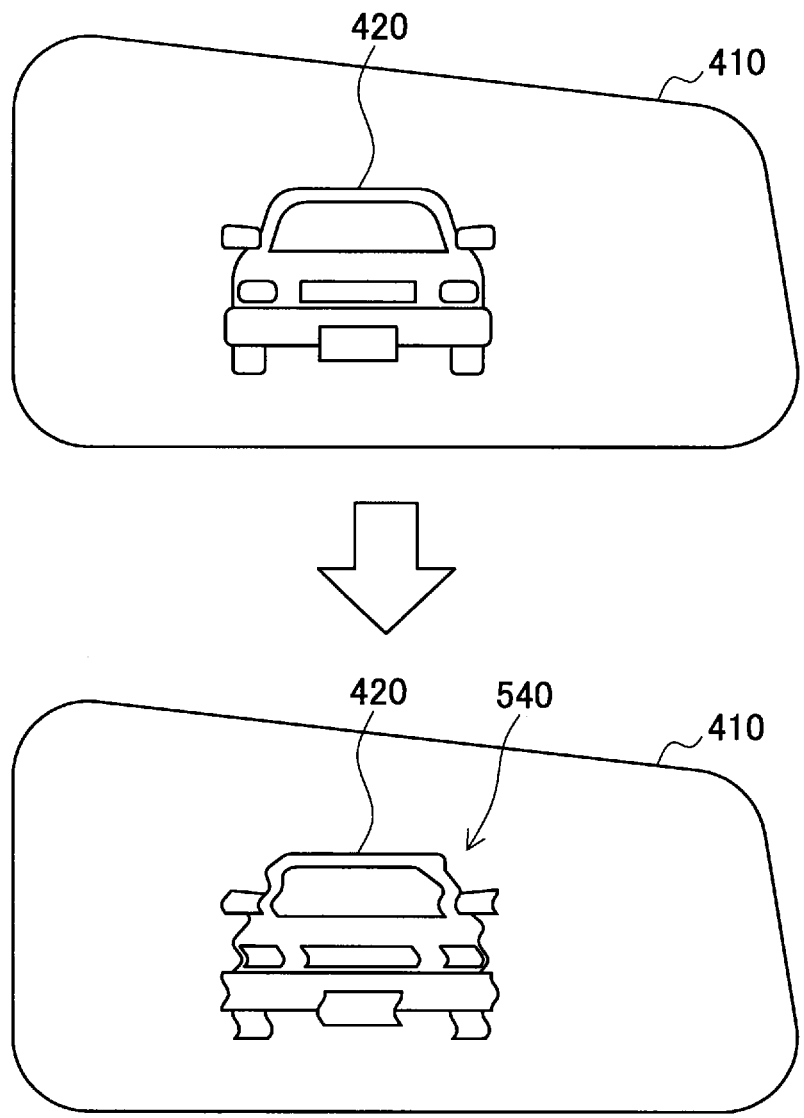

[Fig. 6]
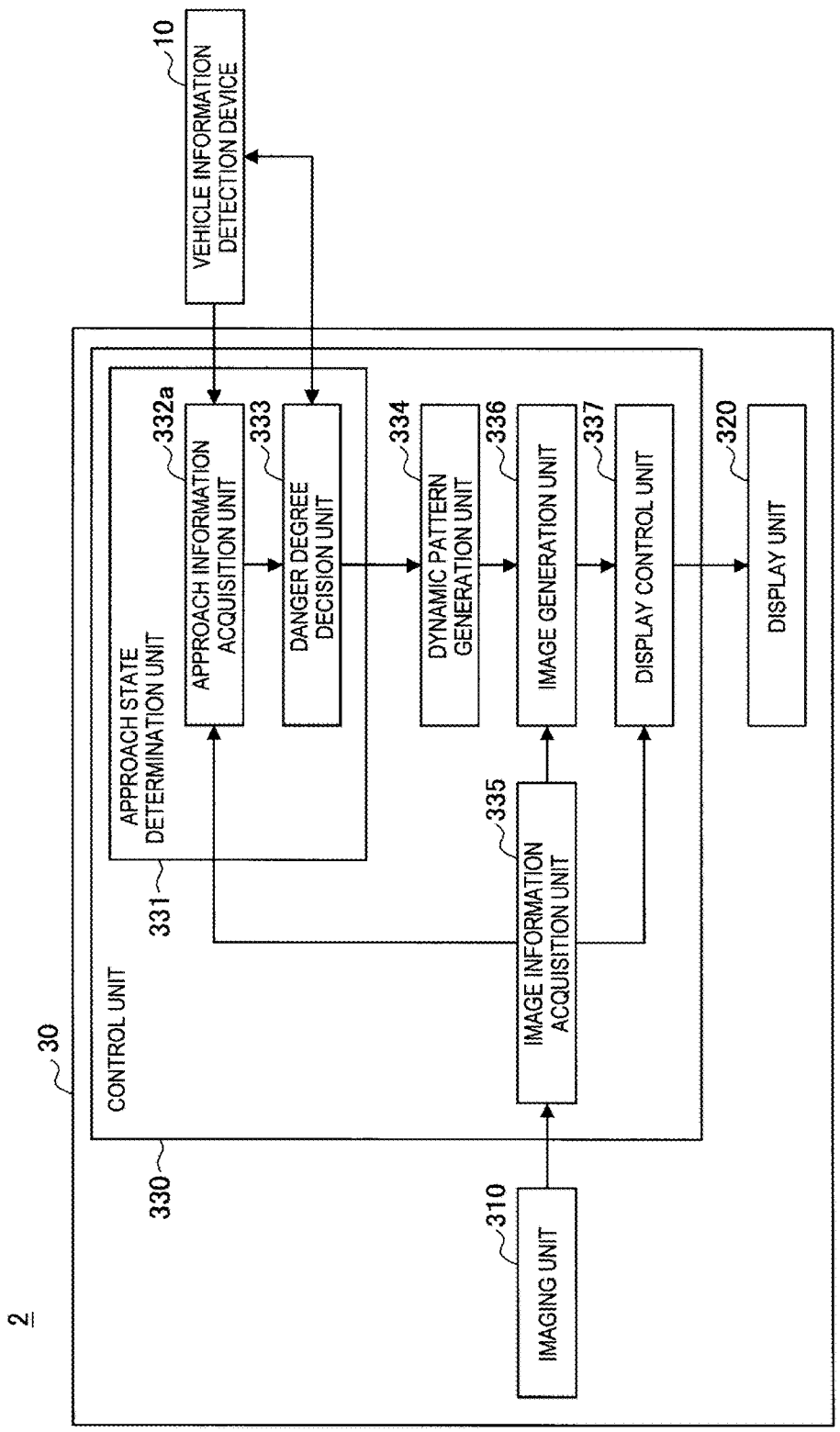

[Fig. 7]
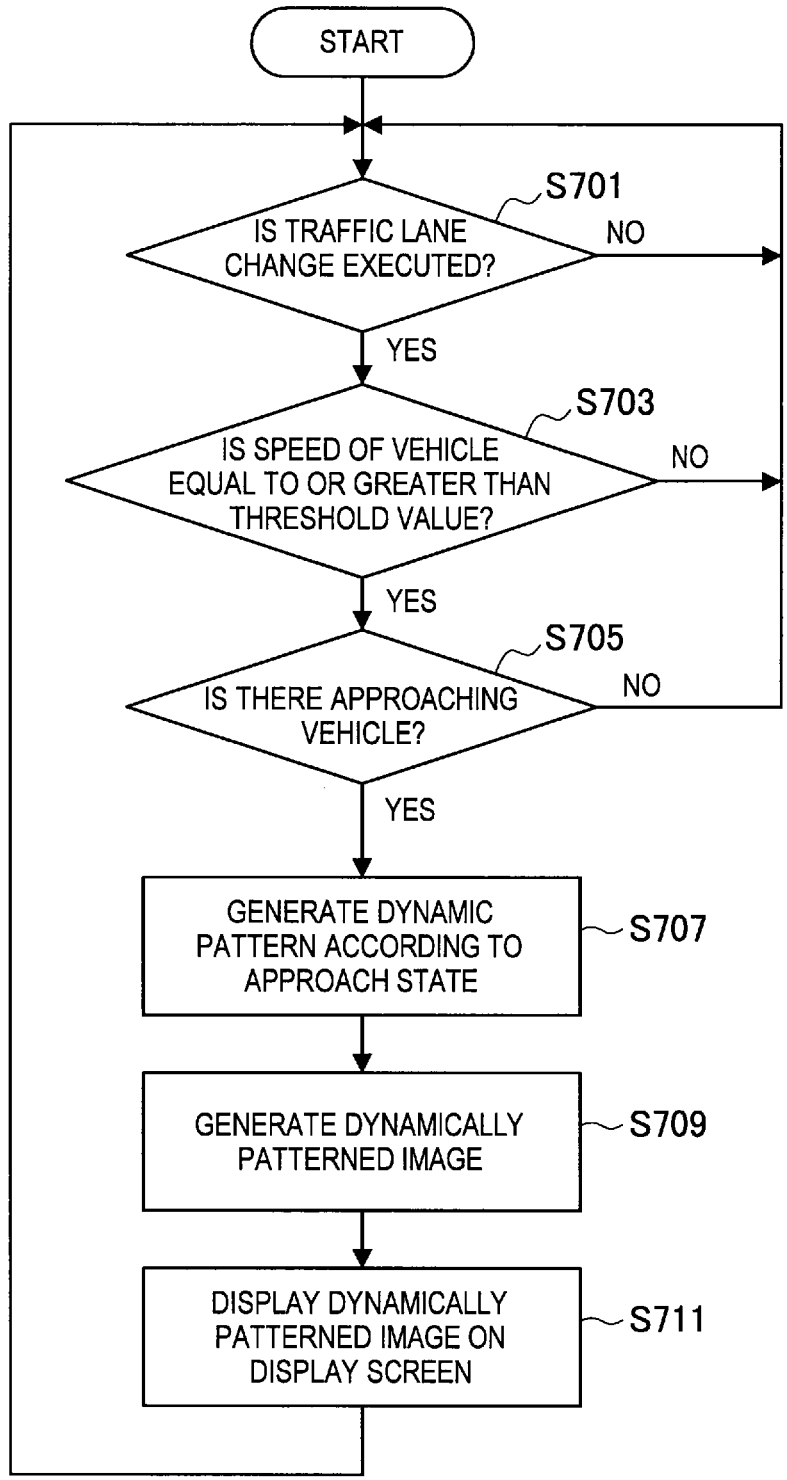

[Fig. 8]
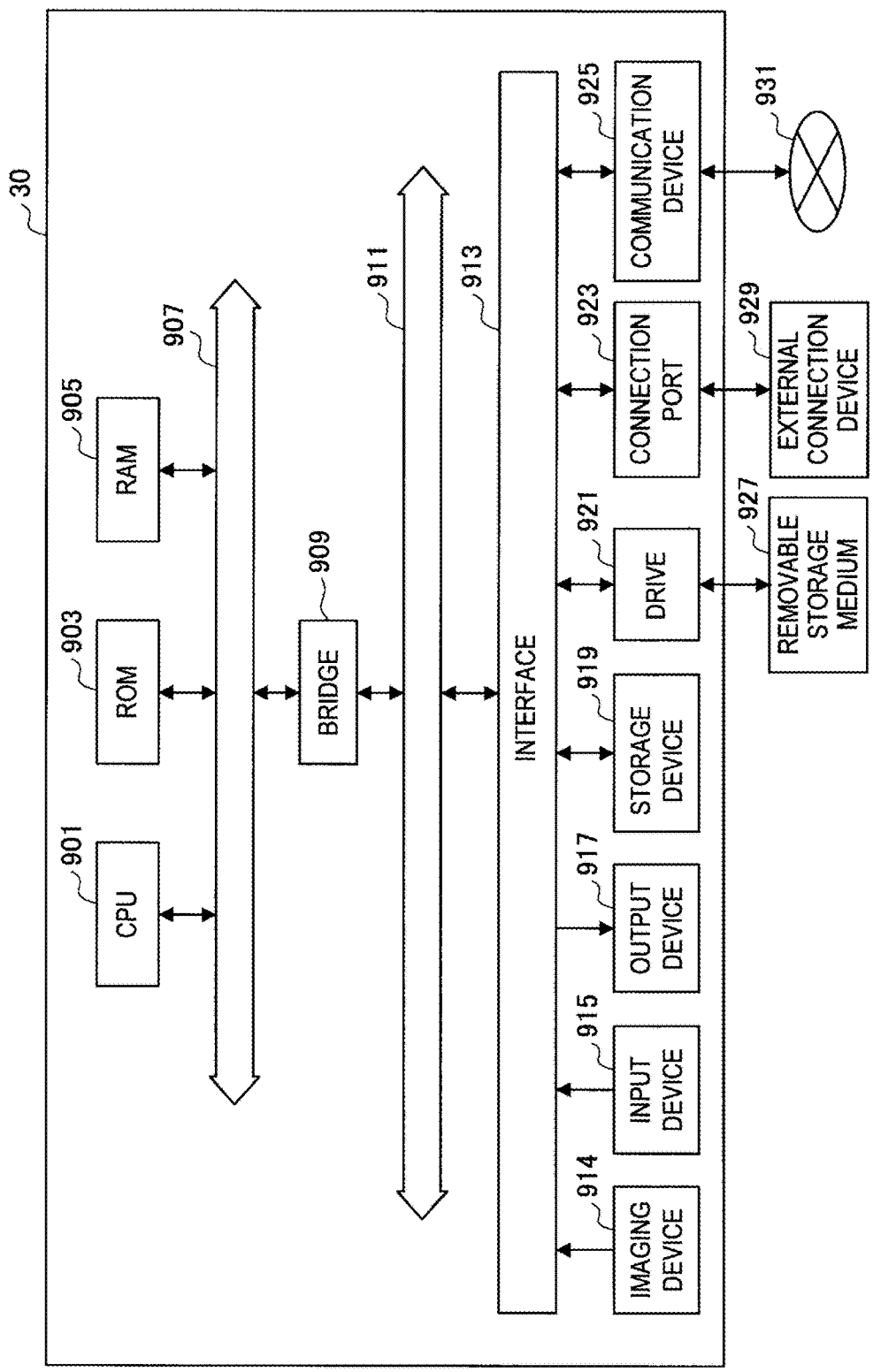

INFORMATION PROCESSING DEVICE, APPROACHING OBJECT NOTIFICATION METHOD, AND PROGRAM

CROSS REFERENCE TO RELATED APPLICATIONS

This application claims the benefit under 35 U.S.C. § 371 as a U.S. National Stage Entry of International Application No. PCT/JP2014/002836, filed in the Japanese Patent Office as a Receiving Office on May 28, 2014, which claims priority to Japanese Priority Patent Application JP 2013-120600 filed Jun. 7, 2013, the entire contents of which are incorporated herein by reference.

TECHNICAL FIELD

The present disclosure relates to an information processing device, an approaching object notification method, and a program.

BACKGROUND ART

In recent years, technologies for displaying images (captured images) captured by in-vehicle cameras on monitors mounted in vehicles have been developed as rear field-of-view support systems configured for drivers to check behind the vehicles. The drivers can confirm a state of the surroundings of their vehicles by viewing the monitors instead of mirrors such as rearview mirrors or sideview mirrors.

On the other hand, systems configured to detect objects (for example, other vehicles or the like approaching from the rear sides) coming relatively close to one's vehicle using the captured images or various sensor devices or the like mounted on the vehicle and notify a driver that such objects (approaching objects) are approaching have been developed. For example, PTL 1 discloses a technology for sensibly notifying a driver of a distance between a vehicle and a nearby obstacle by measuring a distance between the vehicle and the obstacle using a distance measuring sensor and causing a plurality of LEDs to emit light stepwise according to the measured distance.

Here, as a technology for calling the attention of a user by appending a predetermined pattern to a specific object in an image, for example, PTL 2 discloses a technology for notifying a user of a spot which can become defective at the time of combination of images by attaching a zebra pattern to the closest subject in a captured image when a distance up to the closest subject is less than a predetermined threshold value, in a system that combines images captured by a plurality of imaging units and generates a panorama image.

CITATION LIST

Patent Literature

PTL 1: JP 2005-47504A
PTL 2: JP 2011-4340A

SUMMARY

Some Technical Problems

Here, in a system notifying a driver of an approaching object, it is necessary for a driver to recognize the presence of an approaching object quickly and recognize characteristics of the approaching object (for example, the shape (type of vehicle) or an approaching speed of the approaching object) more accurately. In the foregoing technology disclosed in PTL 1, however, since a driver is notified of the presence of an approaching object by emitting light of the LEDs, it is necessary to view the approaching object using a mirror or the like in order to recognize characteristics of the approaching object, as described above, and there is a concern that it takes some time to recognize a situation accurately.

Also, since the line of sight of a driver is typically in a traveling direction ahead of the front windshield during driving of a vehicle, the driver does not continuously view a monitor on which a captured image showing the state of the surroundings is displayed. Accordingly, a driver may be unlikely to recognize the presence of an approaching object quickly when only a zebra pattern is attached to the approaching object on the monitor, as in the technology disclosed in PTL 2.

In light of the above-mentioned circumstances, it is necessary for a driver to recognize the presence of an approaching object quickly and recognize characteristics of the approaching object more accurately according to a necessary situation. Accordingly, embodiments of the present disclosure suggest a novel and improved information processing device, a novel and improved approaching object notification method, and a novel and improved program capable of allowing a driver to recognize an approaching object more quickly and more accurately.

Some Solutions to Problems

According to an embodiment of the present disclosure, there is provided an information processing device including an image information acquisition unit configured to acquire image information regarding a captured image including at least an approaching object, an image generation unit configured to generate a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object, and a display control unit configured to display the dynamically patterned image on the display screen.

According to an embodiment of the present disclosure, there is provided an approaching object notification method including acquiring image information regarding a captured image including at least an approaching object, generating a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object, and displaying the dynamically patterned image on the display screen.

According to an embodiment of the present disclosure, there is provided a program causing a computer to perform: a function of acquiring image information regarding a captured image including at least an approaching object, a function of generating a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object, and a function of displaying the dynamically patterned image on the display screen.

According to an embodiment of the present disclosure, the dynamically patterned image is generated such that the dynamic pattern of which the display varies at the predetermined period on the display screen is set for the approaching object in the captured image including at least the nearby object. Accordingly, by displaying the dynamically patterned image on the display screen, the driver can understand the dynamic pattern of which the display varies periodically within the field of view of the driver and can thus recognize the approaching object quickly even when the driver does not closely observe the display screen. Also, in the dynamically patterned image, the approaching object and the dynamic pattern are displayed together. Thus, since the dynamic pattern is generated so that the driver is not prevented from viewing this object on the display screen when the dynamic pattern is set for the object, the driver can view the display screen and recognize the approaching object accurately.

According to an embodiment of the present disclosure, there is provided a system comprising at least one image capturing device configured to capture an image of an object from a vehicle; at least one display device configured to display the image of the object to an occupant of the vehicle; and at least one control unit configured to: determine whether to alert the occupant to proximity of the object, and in response to determining to alert the occupant to proximity of the object, superimpose, on the image of the object for display on the at least one display device, a moving pattern through which the image of the object remains visible.

According to an embodiment of the present disclosure, there is provided a system comprising at least one processor, and at least one processor-readable storage medium storing processor-executable instructions that, when executed by the at least one processor, cause the at least one processor to: receive an image of an object captured by at least one image capturing device on a vehicle; determine whether to alert an occupant of the vehicle to proximity of the object; in response to determining to alert the occupant to proximity of the object, superimpose on the image of the object a moving pattern through which the image of the object remains visible; and provide the image of the object with the superimposed moving pattern to at least one display device for display to the occupant of the vehicle.

According to an embodiment of the present disclosure, there is provided a method comprising: accessing an image of an object captured by at least one image capturing device on a vehicle; determining whether to alert an occupant of the vehicle to proximity of the object; in response to determining to alert the occupant to proximity of the object, superimposing on the image of the object a moving pattern through which the image of the object remains visible; and displaying the image of the object with the superimposed moving pattern to the occupant of the vehicle on at least one display device.

According to an embodiment of the present disclosure, there is provided at least one processor-readable storage medium storing processor-executable instructions that, when executed, perform a method comprising: accessing an image of an object captured by at least one image capturing device on a vehicle; determining whether to alert an occupant of the vehicle to proximity of the object; in response to determining to alert the occupant to proximity of the object, superimposing on the image of the object a moving pattern through which the image of the object remains visible; and displaying the image of the object with the superimposed moving pattern to the occupant of the vehicle on at least one display device.

Some Advantageous Effects of Some Embodiments

According to an embodiment of the present disclosure described above, a driver is able to recognize an approaching object more quickly and more accurately.

BRIEF DESCRIPTION OF DRAWINGS

FIG. 1 is a schematic diagram illustrating the overview of a vehicle to which an approaching object notification system according to a first embodiment of the present disclosure is applied.

FIG. 2 is a functional block diagram illustrating one configuration example of the approaching object notification system according to the first embodiment of the present disclosure.

FIG. 3A is an explanatory diagram for describing a zebra pattern which is a specific example of a dynamic pattern.

FIG. 3B is an explanatory diagram for describing a zebra pattern which is a specific example of a dynamic pattern.

FIG. 4A is an explanatory diagram for describing a frame-shaped pattern which is a specific example of the dynamic pattern.

FIG. 4B is an explanatory diagram for describing a frame-shaped pattern which is a specific example of the dynamic pattern.

FIG. 5A is an explanatory diagram for describing a wave-shaped pattern which is a specific example of the dynamic pattern.

FIG. 5B is an explanatory diagram for describing a wave-shaped pattern which is a specific example of the dynamic pattern.

FIG. 5C is an explanatory diagram for describing a wave-shaped pattern which is a specific example of the dynamic pattern.

FIG. 6 is a functional block diagram illustrating one configuration example of an approaching object notification system according to a second embodiment of the present disclosure.

FIG. 7 is a flowchart illustrating one processing order example of an approaching object notification method according to the first and second embodiments of the present disclosure.

FIG. 8 is a functional block diagram illustrating one configuration example of a hardware configuration of an approaching object notification device according to the first and second embodiments of the present disclosure.

DESCRIPTION OF EMBODIMENTS

Hereinafter, preferred embodiments of the present disclosure will be described in detail with reference to the appended drawings. Through this specification and the drawings, the same reference numerals are given to constituent elements having substantially the same functional configurations and the repeated description will be omitted.

Also, the description will be made in the following order.
1. First Embodiment
1-1. Overview of approaching object notification system
1-2. Configuration of approaching object notification system
1-3. Specific examples of dynamic patterns 1-3-1. Zebra pattern
1-3-2. Frame-shaped pattern
1-3-3. Wave-shaped pattern
2. Second Embodiment
3. Processing order of approaching object notification method
4. Hardware configuration
5. Conclusion

1. First Embodiment

1-1. Overview of Approaching Object Notification System

First, the overview of an approaching object notification system according to a first embodiment of the present disclosure will be described with reference to FIG. 1. FIG. 1 is a schematic diagram illustrating the overview of a vehicle to which the approaching object notification system according to the first embodiment of the present disclosure is applied. Also, in the following description, examples in which the approaching object notification system according to the present embodiment is applied to a vehicle will be described. However, the present embodiment is not limited to the examples, but the approaching object notification system can be applied to all types of conveyances as long as operators (drivers) can get in and operate the conveyances. Also, in the following description, expressions indicating directions such as front, rear, right, and left sides are assumed to be used to indicate a direction when a driver driving a vehicle serves as the reference.

Referring to FIG. 1, an in-vehicle camera 611 and a ranging sensor device 612 are mounted on a vehicle 610 to which the approaching object notification system according to the first embodiment is applied. The in-vehicle camera 611 is an example of an image capturing device configured to image a state of the surroundings of the vehicle 610, such as by capturing an image viewed from the vehicle. The in-vehicle camera 611 is disposed, for example, to image a range which a driver can normally view using in-vehicle mirrors such as rearview and sideview mirrors. Specifically, the in-vehicle camera 611 is disposed to image a state of the rear side or the right or left rear side of the vehicle 610. Also, in the example illustrated in FIG. 1, the single in-vehicle camera 611 is disposed at the position corresponding to the left sideview mirror of the vehicle 610, but the present embodiment is not limited to this example. The plurality of in-vehicle cameras 611 may be disposed at any positions in the vehicle 610 so that a predetermined range can be imaged.

An image (captured image) captured by the in-vehicle camera 611 is displayed on a monitor (not illustrated) mounted on the same vehicle 610. Accordingly, a driver can confirm a state of the surroundings of the vehicle 610 by viewing the captured image displayed on the monitor. Thus, in the present embodiment, an in-vehicle mirror can be substituted with the in-vehicle camera 611 and the monitor displaying the captured image. The monitor may be installed at a position viewed by the driver inside the vehicle 610 or may be installed at a position at which an in-vehicle mirror is generally installed, instead of the mirror. Also, when the plurality of in-vehicle cameras 611 are disposed, the same number of monitors as the number of in-vehicle cameras 611 may be installed to display captured images captured by the in-vehicle cameras 611.

The ranging sensor device 612 is an example of a distance detection device configured to detect a distance between the vehicle 610 and an object around the vehicle 610. Specifically, the ranging sensor device 612 may include various ranging sensor devices such as a millimeter-wave radar device, an acoustic-wave ranging device, an ultrasonic ranging device, and an optical ranging device. In the example illustrated in FIG. 1, the ranging sensor device 612 is disposed to detect a distance between the vehicle 610 and an object on the rear side or the right or left rear side of the vehicle 610. However, the present embodiment is not limited to this example, but the plurality of ranging sensor devices 612 may be disposed at different positions to detect distances between the vehicle 610 and objects in the front, rear, right, and left directions of the vehicle 610.

Thus, in the approaching object notification system according to the present embodiment, the state of the surroundings of the vehicle 610 is imaged by the in-vehicle camera 611 and a distance between the vehicle 610 and an object near the vehicle 610 is detected by the ranging sensor device 612. Here, as illustrated in FIG. 1, for example, a case in which another vehicle 620 is approaching on the rear left side of the vehicle 610 will be considered. In this case, in the present embodiment, an image including the vehicle 620 captured by the in-vehicle camera 611 is displayed on the monitor mounted on the vehicle 610. Also, the distance between the vehicles 610 and 620 is detected by the ranging sensor device 612. In addition, by displaying a dynamically patterned image, which is an image in which a dynamic pattern is set for the vehicle 620 in the captured image and is an image in which the vehicle 620 and the dynamic pattern are displayed together, on the monitor, the driver is notified of the vehicle 620 (an approaching object or an approaching vehicle) approaching the driver.

Here, the dynamic pattern refers to a moving pattern, e.g., a pattern of which display varies at a predetermined period on a display screen. Such a dynamic pattern can be said to be a pattern that has an action of alerting a human's dynamic visual acuity, in other words, the dynamic pattern can be said to be a pattern easily recognized by a driver. This is the result of an ability regarding vision (a visual ability) of many vertebrate animals, particularly herbivorous animals. Herbivorous animals are known to have a visual field area which is broadened toward the outer circumference of a fovea centralis of an eye and sensitively senses a moving body having a low resolution and moving horizontally, and the visual ability of the herbivorous animals allows them to perceive a slight motion of a predatory animal by sensing a non-steady change in the visual field area. Here, the fovea centralis is a part located at a substantial center of a macular area of a retina in which pyramids are present at a high density and is a part which has high-definition eyesight at a substantial center of the field of view. Also, rod cells that perceive change are known to be distributed abundantly in the periphery of the fovea centralis. Thus, in the present embodiment, the attention of the driver is called using an action of alerting a human's dynamic visual acuity. Specifically, by displaying a dynamically patterned image on the monitor mounted on the vehicle 610, the driver can perceive a dynamic pattern within his or her field of view and can thus recognize an approaching object quickly even without closely observing the monitor.

In the dynamically patterned image according to the present embodiment, a dynamic pattern is set for the vehicle 620, and simultaneously the vehicle 620 and the dynamic pattern are displayed together. That is, the dynamic pattern is set for the vehicle 620 without obstructing the viewing of the vehicle 620. Thus, the image of vehicle 620 remains visible through the moving pattern superimposed on the image of vehicle 620 for display on the display device.

Accordingly, the driver can recognize characteristics of the vehicle 620 (for example, the shape (type of vehicle) or an approaching speed of the vehicle 620), which is an approaching object, more accurately with reference to the dynamically patterned image displayed on the monitor.

The overview of the approaching object notification system according to the first embodiment of the present disclosure has been described above with reference to FIG. 1. Thus, in the present embodiment, the driver can recognize an approaching object approaching his or her vehicle more quickly and more accurately. Hereinafter, a specific function and the configuration of the approaching object notification system according to the present embodiment will be described in detail.

Also, in the example illustrated in FIG. 1, the approaching object is the 4-wheeled vehicle 620, but the present embodiment is not limited to this example. For example, the approaching object may be a light vehicle such as a bicycle or another type of vehicle such as a 2-wheeled vehicle. Also, in the present embodiment, the approaching object may be an object for which a relative distance to the vehicle 610 is closer. Examples of a relatively approaching object include stationary objects such as walls, telephone poles, and guardrails and moving objects such as pedestrians moving at a sufficiently slower speed than the vehicle 610.

1-2. Configuration of Approaching Object Notification System

A schematic configuration of the approaching object notification system according to the first embodiment of the present disclosure will be described with reference to FIG. 2. FIG. 2 is a functional block diagram illustrating one configuration example of the approaching object notification system according to the first embodiment of the present disclosure.

Referring to FIG. 2, an approaching object notification system 1 according to the first embodiment of the present disclosure includes a vehicle information detection device 10, a distance detection device 20, and an approaching object notification device 30. In the present embodiment, the vehicle information detection device 10, the distance detection device 20, and the approaching object notification device 30 are installed in, for example, a vehicle. In the following description, a vehicle is assumed to mean a vehicle on which the vehicle information detection device 10, the distance detection device 20, and the approaching object notification device 30 according to the present embodiment are mounted, unless otherwise stated. Also, a series of processes in the following description is also referred to as an approaching object notification process in the approaching object notification system 1. Also, since the approaching object notification device 30 is a device that mainly performs various kinds of information processing in the approaching object notification process, the approaching object notification device 30 is also referred to as an information processing device 30 in the following description.

The vehicle information detection device 10 detects vehicle information indicating a vehicle state. Here, the vehicle information may include all kinds of information indicating the vehicle state. For example, the vehicle information may include information regarding movement of a vehicle, such as a vehicle speed, the number of rotations of an engine, a steering state, and a gear state (that is, the position of a shift lever). Also, the vehicle information may include information regarding lighting of various lamps such as a direction indicator, a headlight, and a brake lamp or information regarding activation states of equipment such as an air conditioner, a wiper, and a car navigation system.

The vehicle information detection device 10 transmits detected vehicle information to the approaching object notification device 30. Here, the vehicle information detection device 10 may constantly detect the vehicle information or may detect the vehicle information at a predetermined timing in response to an instruction from the approaching object notification device 30. Also, when the vehicle information is changed, for example, when a direction indicator is lighted to express an intent to change traffic lanes, the vehicle information detection device 10 may detect the changed vehicle information and other vehicle information. Also, the vehicle information detection device 10 may frequently transmit the detected vehicle information to the approaching object notification device 30 or may transmit the detected vehicle information at a predetermined timing in response to an instruction from the approaching object notification device 30. Also, when the vehicle information is changed, the vehicle information detection device 10 may transmit only the changed information to the approaching object notification device 30.

The distance detection device 20 detects a distance between the vehicle and an object around the vehicle. The distance detection device 20 corresponds to the ranging sensor device 612 in FIG. 1. For example, the distance detection device 20 may include various ranging sensor devices such as a millimeter-wave radar device, an acoustic-wave ranging device, an ultrasonic ranging device, and an optical ranging device. Also, in FIG. 2, only the single distance detection device 20 is illustrated, but the plurality of distance detection devices 20 may be installed in the vehicle or may detect distances between the vehicle and objects in all of the directions around the vehicle.

The distance detection device 20 transmits information regarding a distance between the vehicle and the detected nearby object to the approaching object notification device 30. Here, the distance detection device 20 may constantly detect a distance between the vehicle and a nearby object or may detect the distance at a predetermined timing in response to an instruction from the approaching object notification device 30. Also, the distance detection device 20 may constantly transmit information regarding a distance between the vehicle and a nearby object to the approaching object notification device 30 or may transmit the information at a predetermined timing in response to an instruction from the approaching object notification device 30. Also, when specific vehicle information is transmitted from the vehicle information detection device 10, the approaching object notification device 30 may instruct the distance detection device 20 to detect a distance between the vehicle and a nearby object and transmit information regarding the distance.

The approaching object notification device 30 integrally controls the approaching object notification process according to the present embodiment. The approaching object notification device 30 includes an imaging unit 310, a display unit 320, and a control unit 330.

The imaging unit 310 has a function of imaging the state of the surroundings of the vehicle. The imaging unit 310 (e.g., at least one image-capturing device) captures a captured image including at least an object around the vehicle and transmits image information regarding the captured image to the control unit 330. The imaging unit 310 may include various camera devices, and can image the state of the surroundings of the vehicle as a moving image and transmit image information thereon to the control unit 330 in real time. Also, the imaging unit 310 corresponds to the in-vehicle camera 611 in FIG. 1. Also, only the single imaging unit 310 is illustrated in FIG. 2. However, the plurality of imaging units 310 may be installed and may perform imaging in all of the directions around the vehicle and transmit image information regarding a plurality of captured images to the control unit 330.

The display unit 320 is an output interface that visually displays various kinds of processed information or processed results in the approaching object notification device 30 on at least one display device such as a display screen. In the present embodiment, the display unit 320 displays a captured image captured by the imaging unit 310 on the display screen under the control from the control unit 330. Also, the display unit 320 displays a dynamically patterned image in which a dynamic pattern is set in the captured image on the display screen under the control from the control unit 330. Thus, since the captured image or the dynamically patterned image is displayed on the display screen of the display unit 320, the state of the surroundings of the vehicle can be said to be displayed on the display unit 320. Accordingly, when the imaging unit 310 images the rear side or the right or left rear side of the vehicle and the display unit 320 displays the captured image of the rear side or the right or left rear side of the vehicle or the dynamically patterned image, the display unit 320 can be said to take the place of an in-vehicle mirror. The display unit 320 may be installed at a position viewed by a driver or another occupant in the vehicle or may be installed at a position in which an in-vehicle mirror is generally installed instead of the in-vehicle mirror. Also, only the single display unit 320 is illustrated in FIG. 2, but the plurality of display units 320 may be installed. Further, when the plurality of imaging units 310 are disposed, the same number of display units 320 as the number of imaging units 310 may be installed so that captured images by the imaging units 310 are displayed individually.

The control unit 330 integrally controls the approaching object notification device 30 and performs various kinds of information processing in the approaching object notification process according to the present embodiment. Hereinafter, the function and the configuration of the control unit 330 will be described in detail.

The control unit 330 includes an approach state determination unit 331, a dynamic pattern generation unit 334, an image information acquisition unit 335, an image generation unit 336, and a display control unit 337.

In some embodiments, the control unit 330 may be configured to determine whether to alert an occupant of the vehicle to proximity of an object using the approach state determination unit 331. The approach state determination unit 331 determines a state of an object that is approaching (approaching object). Here, the state (approach state) of the approaching object includes information regarding a distance between the vehicle and the approaching object and a speed or direction of the object approaching the vehicle. Also, the state of the approaching object includes information regarding the degree of danger of an approaching object as an index indicating danger of collision of the approaching object with the vehicle. Also, in the present embodiment, the approach state is determined based on information regarding a distance between the vehicle and an approaching object detected by the distance detection device 20.

The function and the configuration of the approach state determination unit 331 will be described in more detail. The approach state determination unit 331 includes an approach information acquisition unit 332 and a danger degree decision unit 333.

The approach information acquisition unit 332 acquires approach information which is information regarding an approaching object. The approach information is, for example, information regarding the presence of an approaching object, a distance between the vehicle and the approaching object, and an approaching speed, direction, or the like of the approaching object. In the present embodiment, the approach information acquisition unit 332 receives the information regarding the distance between the vehicle and the approaching object from the distance detection device 20. The approach information acquisition unit 332 can acquire, for example, the approach information including the above-described content based on the information regarding the distance. The approach information acquisition unit 332 transmits the acquired approach information to the danger degree decision unit 333.

Here, based on the information regarding the distance frequently transmitted from the distance detection device 20, the approach information acquisition unit 332 may frequently acquire the approach information or may acquire the approach information at a predetermined timing. The predetermined timing may be, for example, a timing at which specific vehicle information is detected by the vehicle information detection device 10. Thus, in the present embodiment, the approach information acquisition unit 332 may receive vehicle information from the vehicle information detection device 10 or may acquire the approach information when specific vehicle information is received. That is, in the present embodiment, the approach information may be acquired when the specific vehicle information is detected. In the following description, vehicle information triggering acquisition of the approach information by the approach information acquisition unit 332 is referred to as trigger information. When the approach information acquisition unit 332 acquires the approach information according to the trigger information, the approach information acquisition unit 332 receiving the trigger information may cause the distance detection device 20 to detect a distance between the vehicle and an object by transmitting an instruction to detect the distance to the distance detection device 20. Also, in the approaching object notification process according to the present embodiment, a series of processes in the approaching object notification process are performed when the approach information acquisition unit 332 acquires the approach information. Therefore, the trigger information can be said to be vehicle information triggering start of the approaching object notification process.

Here, specific examples of the trigger information will be described. For example, the trigger information may be information regarding a speed of the vehicle. When the speed of the vehicle is greater than a predetermined threshold speed, danger of collision with the object is considered to be high and necessity to notify of the approaching object is considered to be high. The control unit 330 may thus be configured to determine whether to alert the occupant to proximity of the object based at least in part on whether the vehicle's speed is greater than a threshold speed. Accordingly, when vehicle information indicating that the speed of the vehicle is greater than a predetermined speed is detected, the approaching object notification process may be performed.

Also, for example, the trigger information may be information regarding driving of a direction indicator of the vehicle. When the vehicle drives one of the right and left direction indicators, there is a high probability of the vehicle turning right or left or changing traffic lanes, and thus there is a concern of the collision with the object approaching from the blind corner of the driver. The control unit 330 may thus be configured to determine whether to alert the occupant to proximity of the object based at least in part on whether a direction indicator in the vehicle is activated. Accordingly, when vehicle information indicating that the vehicle drives one of the right and left direction indicators is detected, the approaching object notification process may be performed.

Also, for example, the trigger information may be information regarding the position of a shift lever of the vehicle. For example, when the shift lever is moved from the position of "P" (park) to another position, the vehicle is considered to move from the parked state, and thus it is considered necessary for the driver to pay attention to the surroundings of the vehicle. Accordingly, when vehicle information indicating that the position of the shift lever is moved from the position of "P" to another position is detected, the approaching object notification process may be performed. Also, for example, when the shift lever is at the position of "R" (reverse), the vehicle moves backward. Therefore, the field of view of the driver is narrower than when the vehicle moves forward, and thus necessity to notify of the approaching object is considered to be high. The control unit 330 may thus be configured to determine whether to alert the occupant to proximity of the object based at least in part on whether the vehicle is in reverse. Accordingly, when vehicle information indicating that the shift lever is at the position of "R" is detected, the approaching object notification process may be performed.

The specific examples of the trigger information have been described above, but the trigger information in the present embodiment is not limited to these examples. The trigger information may be any information as long as the information is information including the vehicle information and may be set appropriately by a driver or a designer of the approaching object notification system. For example, when a system detecting the line of sight, the position and posture of a head, or the like of the driver is mounted on the vehicle, information indicating the line of sight, the position and posture of the head, or the like detected by the system may be included in the vehicle information or this information may be used as trigger information. The control unit 330 may thus be configured to determine whether to alert the occupant to proximity of the object based at least in part on head motion of a driver of the vehicle. Specifically, for example, when information indicating that the driver moves his or her line of sight or the head is moved to check before changing traffic lanes or to directly confirm the field of view of the oblique rear side as legally necessary when changing traffic lanes is detected as trigger information, the approaching object notification process may be performed. Also, the system detecting the line of sight, the position and posture of the head, or the like of the driver includes an imaging device that captures, for example, a state of the eyeballs, the position or a motion of the head, or the like of the driver as an image, various ranging sensor devices that capture a motion of the head of the driver as a change in a distance, and a control device that determines information indicating the state of the line of sight, the position and posture of the head, or the like of the driver and determines whether this information is included in the trigger information, based on the image acquired by the imaging device or distance information detected by the ranging sensor device.

Thus, the approaching object notification process according to the present embodiment may be frequently performed on an approaching object or may be performed on an approaching object present when the trigger information is detected. Also, the approaching object notification process performed using the trigger information has an excellent advantage from an ergonomic viewpoint as well. This is because a dynamic pattern for calling the driver's attention is shown in the peripheral field of view of the driver only when necessary by performing the approaching object notification process, that is, by changing an image presented to the driver when the trigger information is detected. Accordingly, since frequent display of the dynamic pattern is avoided and an effect of preventing desensitization due to the habituation of the display of the image shown in the field of view can be obtained, it is possible to call the driver's attention more efficiently. Also, the driver may arbitrarily switch a change between frequent execution of the approaching object notification process and execution of the approaching object notification process at the time of the detection of the trigger information. Also, the driver may appropriately select vehicle information to be used as the trigger information.

In some embodiments, determining whether to alert the occupant to proximity of the object may include calculating a degree of danger of the object based at least in part on a distance between the vehicle and the object. The danger degree decision unit 333 decides the foregoing degree of danger of the object based on the approach information acquired by the approach information acquisition unit 332. Here, the degree of danger may be an index that indicates danger of collision of the vehicle with the approaching object. For example, the degree of danger may be expressed as a score and the danger degree decision unit 333 may perform calculation so that the score indicating the degree of danger is higher as the distance between the vehicle and the approaching object is smaller and the speed of the approaching object is faster. Also, the danger degree decision unit 333 may receive the vehicle information from the vehicle information detection device 10 and decide the degree of danger based on the vehicle information. That is, in the present embodiment, the degree of danger may be decided further based on the vehicle information. Also, the method of deciding the degree of danger of the approaching object by the danger degree decision unit 333 is not limited to the score scheme, but various methods may be used. For example, a storage unit (not illustrated) of the approaching object notification device 30 may store values of the degrees of danger according to various situations included in the approach information and/or the vehicle information as a table, and the danger degree decision unit 333 may decide the degree of danger with reference to the table based on the approach information and/or the vehicle information.

Here, specific examples in which the danger degree decision unit 333 decides the degree of danger based on the vehicle information will be described. For example, the danger degree decision unit 333 may decide the degree of danger based on the vehicle information regarding the speed of the vehicle. For example, when it is assumed that the speed of the vehicle is sufficiently slow and the vehicle is traveling in a traffic lane in which vehicles are congested or a traffic lane in which vehicles are waiting at a stoplight, the danger degree decision unit 333 may decide that the degree of danger is low even when the distance between the vehicle and a nearby object (for example, another vehicle to the front or rear) is relatively small. Also, for example, when it is assumed that the speed of the vehicle is sufficiently fast and the vehicle is traveling on a highway, the danger degree decision unit 333 can decide that the degree of danger is high even when a distance between the vehicle and a nearby object (for example, another vehicle to the front or rear) is the same as the distance of the case in which the speed is slow. Thus, the determination of whether to alert the occupant to proximity of the object may be made based at least in part on whether the vehicle's speed is greater than a threshold speed, and the danger degree decision unit 333 may decide the degree of danger differently according to the vehicle information even when deciding the degree of danger based on the approach information regarding almost the same content.

Also, for example, the danger degree decision unit 333 may decide the degree of danger based on the vehicle information regarding driving (activation) of a direction indicator of the vehicle. For example, when the vehicle drives one of the right and left direction indicators, there is a high probability of the vehicle attempting to turn right or left or change traffic lanes. Therefore, the danger degree decision unit 333 may decide that the degree of danger of an object in the direction in which the direction indicator is driven is higher than the degree of danger of an object in another direction. For example, when the vehicle drives the left direction indicator while traveling at a speed equal to or greater than a predetermined speed, the vehicle is assumed to intend to change to a left-side traffic lane. Accordingly, the danger degree decision unit 333 can decide that the degree of danger of an approaching object on the left rear side of the vehicle is higher than that of an approaching object in another direction (for example, the rear side or the right rear side). Thus, the determination of whether to alert the occupant to proximity of the object may be made based at least in part on whether a direction indicator in the vehicle is activated.

Also, for example, the danger degree decision unit 333 may decide the degree of danger based on vehicle information regarding the position of the shift lever of the vehicle. For example, when the shift lever is at the position of "R," that is, the vehicle is to move backward, it may be decided that the degree of danger of an approaching object on the rear side of the vehicle that is relatively difficult for the driver to view is higher than the approaching object in another direction (for example, the front side or the left or right sides). Thus, the determination of whether to alert the occupant to proximity of the object may be made based at least in part on whether the vehicle is in reverse.

Although the specific examples in which the danger degree decision unit 333 decides the degree of danger based on the vehicle information have been described above, the vehicle information used for the danger degree decision unit 333 to decide the degree of danger is not limited to these examples. The danger degree decision unit 333 may decide the degree of danger based on all kinds of information included in the vehicle information. For example, the danger degree decision unit 333 may decide the degree of danger based on vehicle information indicating the state of the line of sight, the position and posture of the head, or the like of the driver detected by the system that detects the state of the line of sight, the position and posture of the head, or the like of the driver, as described above. Specifically, for example, when the danger degree decision unit 333 decides that the vehicle attempts to turn right or left or change traffic lanes based on a change in the line of sight, the position and posture of the head, or the like of the driver, the danger degree decision unit 333 may decide that the degree of danger of an object in a direction in which the driver attempts to turn right or left or change traffic lanes, that is, a direction in which the line of sight of the driver is oriented and/or the driver inclines his or her head is higher than the degree of danger of an object in another direction. Here, the case in which it is determined that the vehicle turns right or left or changes traffic lanes may be, for example, a case in which the line of sight, the position and posture of the head, or the like of the driver is oriented to the right or left or is oriented to the oblique rear side of the vehicle as a confirmation action associated with the change in traffic lanes. Also, for example, the danger degree decision unit 333 may decide the degree of danger based on vehicle information indicating the line of sight of the driver. For example, when the line of sight of the driver is concentrated on the front side (front windshield) of the vehicle, there is a high probability of the driver not noticing an approaching object from the rear side or a lateral side. In this case, the danger degree decision unit 333 may decide that the degree of danger of an approaching object in a direction in which the line of sight of the driver is not oriented is relatively higher. Thus, the determination of whether to alert the occupant to proximity of the object may be made based at least in part on head motion of a driver of the vehicle. Also, vehicle information by which the danger degree decision unit 333 decides the degree of danger may be set appropriately by the driver or a designer of the approaching object notification system.

The danger degree decision unit 333 transmits danger degree information which is information regarding the decided degree of danger to the dynamic pattern generation unit 334. Also, the danger degree decision unit 333 may also transmit the approach information received from the approach information acquisition unit 332 to the dynamic pattern generation unit 334.

The functions of the approach information acquisition unit 332 and the danger degree decision unit 333 included in the approach state determination unit 331 have been described in detail above. Thus, the state of the approaching object determined by the approach state determination unit 331 may include the approach information acquired by the approach information acquisition unit 332 and the danger degree information which is information regarding the degree of danger decided by the danger degree decision unit 333. The approach state determination unit 331 transmits information regarding the determined state of the approaching object to the dynamic pattern generation unit 334.

In some embodiments, in response to determining to alert the vehicle occupant to proximity of the approaching object, control unit 330 may superimpose, on the image of the object for display on display unit 320, a moving pattern through which the image of the object remains visible. Based on the determination result of the approach state determination unit 331, the dynamic pattern generation unit 334 generates a dynamic pattern of which display varies at a predetermined period on the display screen of the display unit 320. Here, the dynamic pattern is a pattern which is set for an approaching object on the display screen and is displayed along with the approaching object and is a pattern which does not obstruct viewing of the approaching object on the display screen. The dynamic pattern generation unit 334 may generate the dynamic pattern when the approach information acquisition unit 332 acquires information indicating the presence of an approaching object. Also, the dynamic pattern generation unit 334 may generate the dynamic pattern when the degree of danger decided by the danger degree decision unit 333 is equal to or greater than a predetermined threshold value. Also, in the present embodiment, a dynamic pattern generation process by the dynamic pattern generation unit 334 does not necessarily mean that a pattern on the display screen is generated from scratch, but may include a process of selecting an appropriate dynamic pattern among a plurality of kinds of preliminarily prepared dynamic patterns based on the determination result of the approach state determination unit 331.

Since the dynamic pattern varies at the predetermined period on the display screen, the driver can understand that the variation occurs on the display screen in the field of view, and thus can quickly recognize that there is an approaching object. Also, since the viewing of the approaching object for which the dynamic pattern is set is not obstructed, the driver can recognize the approaching object accurately. Thus, the dynamic pattern according to the present embodiment may be a pattern which has a shape and a variation in its display that alerts the dynamic visual acuity of the driver when the pattern is displayed on the display screen and which does not obstruct the viewing of the approaching object for which the pattern is set, but the embodiment is not limited to this form. Specific examples of the dynamic pattern will be described in detail below in (1-3. Specific examples of dynamic patterns).

Also, the dynamic pattern generation unit 334 may generate different dynamic patterns according to the degree of danger decided by the danger degree decision unit 333. For example, the dynamic pattern generation unit 334 may generate dynamic patterns with different colors according to the degree of danger decided by the danger degree decision unit 333. Specifically, the dynamic pattern generation unit 334 can generate dynamic patterns with colors (for example, warning colors or the like) which easily draw the attention of the driver when the degree of danger is high. For example, when the degree of danger is low, the dynamic pattern generation unit 334 may generate a blue dynamic pattern. When the degree of danger is intermediate, the dynamic pattern generation unit 334 may generate a yellow dynamic pattern. When the degree of danger is high, the dynamic pattern generation unit 334 may generate a red dynamic pattern.

Also, for example, the dynamic pattern generation unit 334 may generate the dynamic patterns for which display variation speeds are different according to the degree of danger decided by the danger degree decision unit 333. Specifically, the dynamic pattern generation unit 334 may increase the display variation speed of the dynamic pattern as the degree of danger increases. Thus, since the dynamic pattern generation unit 334 changes the color and/or the display variation speed of the dynamic pattern according to the magnitude of the degree of danger, the driver can intuitively recognize the magnitude of the degree of danger.

The dynamic pattern generation unit 334 transmits the generated dynamic pattern to the image generation unit 336. Also, the dynamic pattern generation unit 334 may transmit information regarding the state of the approaching object determined by the approach state determination unit 331 to the image generation unit 336.

The image information acquisition unit 335 acquires image information regarding a captured image including at least an approaching object. In the present embodiment, the image information acquisition unit 335 acquires the image information from the imaging unit 310. Also, the image information acquisition unit 335 may perform various processes performed in general image processing, such as a black level correction process, a luminance correction process, and a white balance correction process, on the acquired image information. The image information acquisition unit 335 transmits the image information regarding the captured image to the image generation unit 336 and the display control unit 337.

Based on the determination result regarding the state of the approaching object, the image generation unit 336 generates a dynamically patterned image that is an image in which a dynamic pattern of which the display varies at the predetermined period on the display screen is set for an approaching object in the captured image and that is an image in which the approaching object and the dynamic pattern are displayed together. In the present embodiment, based on the determination result of the approach state determination unit 331, the image generation unit 336 generates a dynamically patterned image that is an image in which a dynamic pattern is set for an approaching object in the captured image and that is an image in which the approaching object and the dynamic pattern are displayed together. Here, information regarding the state of the approaching object is transmitted from the dynamic pattern generation unit 334 to the image generation unit 336. Accordingly, the image generation unit 336 can recognize a direction of the approaching object with respect to the vehicle and a distance of the approaching object. Also, image information regarding the captured image including at least a nearby object is transmitted from the image information acquisition unit 335 to the image generation unit 336. Accordingly, the image generation unit 336 can match an object approaching the vehicle with the object in the captured image by integrating the received information and can set the dynamic pattern for the approaching object in the captured image. Also, the image generation unit 336 may recognize the degree of danger of the object in the captured image based on the information regarding the state of the approaching object, and may set the dynamic pattern when the degree of danger is equal to or greater than the predetermined threshold value. The image generation unit 336 transmits the generated dynamically patterned image to the display control unit 337.

The display control unit 337 controls driving of the display unit 320 such that various kinds of information processed in the approaching objet notification device 30 are visually displayed in any form such as text, a table, a graph, and an image on the display screen of the display unit 320. In the present embodiment, the display control unit 337 displays the dynamically patterned image generated by the image generation unit 336 on the display screen of the display unit 320. Also, the display control unit 337 may display the captured image captured by the imaging unit 310 on the display screen of the display unit 320. When the plurality of imaging units 310 and display units 320 are disposed, the display control unit 337 may control driving of the plurality of display units 320 such that a plurality of captured images captured by the imaging units 310 or a plurality of dynamically patterned images generated based on the captured images are displayed on the corresponding display units 320.

One configuration example of the approaching object notification system 1 according to the first embodiment of the present disclosure has been described in detail above with reference to FIG. 2. Each of the foregoing constituent elements may be configured using a general member or circuit or may be configured by hardware specialized for the function of each constituent element. Also, in particular, all of the functions of the constituent elements in the control unit 330 of the approaching object notification device 30 may be realized by at least one processor (such as a CPU) or the like. Processor-readable instructions may be stored on at least one processor-readable storage medium, and when executed by the processor(s), may cause the processor(s) to perform any of the functionality of control unit 330 described herein. Accordingly, a configuration to be used can be changed appropriately according to a technical level at the time of realization of the present embodiment.

In the first embodiment, as described above, the dynamic pattern generation unit 334 generates the dynamic pattern of which the display varies at the predetermined period on the display screen of the display unit 320. Also, the image generation unit 336 generates the dynamically patterned image that is an image in which a dynamic pattern is set for an approaching object in a captured image and that is an image in which the approaching object and the dynamic pattern are displayed together. Further, the display control unit 337 displays the dynamically patterned image on the display screen of the display unit 320. Accordingly, since the dynamic pattern varies at the predetermined period on the display screen, the driver can understand that the variation occurs on the display screen in the field of view, and thus can quickly recognize that there is an approaching object. Also, since the viewing of the approaching object for which the dynamic pattern is set is not obstructed, the driver can recognize the approaching object accurately. Accordingly, in the first embodiment, the driver can be notified of the approaching object more quickly and more accurately.

Here, as another method of calling the attention of the driver to an approaching object, a method of painting a region corresponding to the approaching object in the captured image displayed on the display screen a predetermined color (for example, a warning color such as red) can be considered. However, in this method, there is a concern that the driver may not sufficiently recognize characteristics of the approaching object and, for example, it may be difficult to distinguish the approaching object which the driver should normally identify instantly, or to determine a relative speed with respect to the approaching object. On the other hand, in the present embodiment, as described above, the dynamic pattern is set for the approaching object on the display screen. The image of the object remains visible through the moving pattern, and thus the dynamic pattern does not prevent the driver from viewing the approaching object. Accordingly, in the present embodiment, the driver can instantly recognize his or her surroundings including the approaching object more quickly and perform accurate situation determination and an operation on the own vehicle.

Also, in the example illustrated in FIG. 2, the approaching object notification device 30 includes the imaging unit 310, the display unit 320, and the control unit 330, but the present embodiment is not limited to this example. For example, the approaching object notification device 30 may further include an input unit configured for the driver to input various kinds of information, a storage unit configured to store various kinds of information processed in the approaching object notification device 30, and a communication unit configured to transmit and receive information to and from other external devices in an integrated manner. Also, the approaching object notification device 30 may not be configured by a single device and the functions of the approaching object notification device 30 may be configured to be distributed to a plurality of given devices. For example, only the imaging unit 310 and the display unit 320 may be mounted on the vehicle, the control unit 330 may be mounted on any information processing device such as a server other than the vehicle, and the imaging unit 310 and the display unit 320 may transmit and receive various kinds of information to and from the control unit 330, so that the various processes in the above-described approaching object notification device 30 can be performed. Also, for example, the approaching object notification device 30 may be configured to be separated into a first device that mainly performs functions regarding the determination of the state of the approaching object by the approach state determination unit 331 and a second device that mainly performs the functions regarding the image processing performed by the imaging unit 310, the display unit 320, the dynamic pattern generation unit 334, the image information acquisition unit 335, the image generation unit 336, and the display control unit 337. Also, the first device may be the distance detection device 20, that is, the distance detection device 20 may have the functions regarding the determination of the state of the approaching object by the approach state determination unit 331. The second device may be the approaching object notification device 30 that has the other functions (the functions regarding the foregoing image processing) in the control unit 330. The distance detection device 20 and the approaching object notification device 30 may perform the approaching object notification process according to the present embodiment by transmitting and receiving various kinds of information. Further, when the approaching object notification device 30 is configured to be separated into the first and second devices, the function of the dynamic pattern generation unit 334 may be mounted on the first device. Thus, in the approaching object notification system 1 according to the present embodiment, each process of the approaching object notification system 1 described above may be performed. The approaching object notification system 1 may have any configuration without limitation to the configuration example illustrated in FIG. 2. A device configuration to be realized in the approaching object notification system 1 according to the present embodiment and a function of each device to be performed may be appropriately set.

The approaching object notification system 1 according to the first embodiment can be applied even when there are a plurality of approaching objects. For example, when there are a plurality of approaching objects, the approach state determination unit 331 may determine an approach state of each object. Also, based on the determination result of the approach state determination unit 331, the dynamic pattern generation unit 334 may generate mutually different dynamic patterns for the plurality of approaching objects. Also, based on the determination result of the approach state determination unit 331, the image generation unit 336 may generate dynamically patterned images in which mutually different dynamic patterns are set for the plurality of approaching objects in a captured image. In the dynamically patterned images, for example, a dynamic pattern (for example, a high display variation speed or a warning color) that draws the attention of the driver more easily may be set for an approaching object for which the degree of danger is decided to be highest. Accordingly, referring to the display unit 320 on which this dynamically patterned image is displayed, the driver can recognize information regarding the presence of the plurality of approaching objects, the approaching speeds or directions of the approaching objects, the types of vehicles of the approaching objects, and the degrees of danger of the approaching objects more quickly and more accurately.

1-3. Specific Examples of Dynamic Patterns

Next, specific examples of dynamic patterns according to the present embodiment will be described with reference to FIGS. 3A, 3B, 4A, 4B, and 5A to 5C. Also, FIGS. 3A, 3B, 4A, 4B, and 5A to 5C are diagrams illustrating states in which captured images or dynamically patterned images are displayed on the display screen. However, for the sake of simplicity, the drawings illustrate states in which only a single vehicle is shown as an approaching object, and only the vehicle which is the approaching object and a dynamic pattern set for the vehicle among objects included in the captured image or the dynamically patterned image are shown on the display screen. In FIGS. 3A, 3B, 4A, 4B, and 5A to 5C, a display screen imitating a shape of an in-vehicle mirror is illustrated as an example of the display screen. However, the display screen according to the present embodiment is not limited to this example, but any shape may be used in consideration of convenience of the driver.

(1-3-1. Zebra Pattern)

First, a case in which the dynamic pattern is a zebra pattern will be described with reference to FIGS. 3A and 3B. FIGS. 3A and 3B are explanatory diagrams for describing the zebra pattern which is a specific example of the dynamic pattern.

Referring to FIG. 3A, a state in which a captured image is displayed on a display screen 410 is illustrated in the upper part and a state in which a moving image patterned image is displayed on the display screen 410 is illustrated in the lower part. That is, the display of the display screen 410 illustrated in the lower part shows a state in which a zebra pattern 510 which is a dynamic pattern is set on the display of the display screen 410 illustrated in the upper part.

Referring to FIG. 3A, in the captured image illustrated in the upper part, an approaching vehicle 420 which is an approaching object is displayed on the display screen 410. In addition, in the dynamically patterned image illustrated in the lower part, the zebra pattern 510 is displayed to overlap the approaching vehicle 420. Thus, the dynamic pattern according to the present embodiment may be the zebra pattern 510 in which line segments with a predetermined width are arranged at predetermined intervals, and the dynamically patterned image may be an image in which the zebra pattern 510 overlaps the approaching object. Also, the zebra pattern 510 is displayed such that the line segments forming the zebra pattern 510 are moved.

A state in which the display of the zebra pattern 510 varies is illustrated in FIG. 3B. As illustrated in FIG. 3B, zebra patterns 510*a*, 510*b*, and 510*c* may be moved at a predetermined speed in a right or left direction of the display screen 410. In the example illustrated in FIG. 3B, the zebra pattern 510*b* shows a state in which the line segments of the zebra pattern 510*a* are moved from the right to the left by a predetermined distance in the direction of a paper surface. Likewise, the zebra pattern 510*c* shows a state in which the line segments of the zebra pattern 510*b* are moved from the right to the left by the predetermined distance in the direction of the paper surface, and the zebra pattern 510*a* shows a state in which the line segments of the zebra pattern 510*c* are moved from the right to the left by the predetermined distance in the direction of a paper surface.

In the present embodiment, however, the variation in the display of the zebra pattern 510 is not limited to this example, but the display of the zebra pattern 510 may vary on the display screen 410 so that the display alerts the dynamic visual acuity of the driver, and a method of varying the display may be realized in any form. Here, in the zebra pattern 510, the display can be said to vary when the line segments are moved in a direction different from the extension direction of the line segments of the zebra pattern 510. Accordingly, in the zebra pattern 510, the line segments may be moved in any direction as long as the line segments are moved so that the display varies. Also, the display of the zebra pattern 510 may vary by periodically changing the width of the line segments of the zebra pattern 510 or an interval between the line segments.

Here, for example, since the line segments forming the zebra pattern 510 are colored translucently, the zebra pattern 510 according to the present embodiment is configured such that a region overlapping the line segments in the approaching vehicle 420 can be viewed by the driver. Accordingly, the driver who confirms the display screen 410 can view a state in which the zebra pattern 510 moves on the approaching vehicle 420 and can view an image of the approaching vehicle 420 from the intervals between the line segments and on the line segments of the zebra pattern 510. Thus, since the zebra pattern 510 is generated so that the driver is not prevented from viewing the approaching vehicle 420, the driver can recognize the approaching vehicle 420 accurately.

(1-3-2. Frame-Shaped Pattern)

Next, a case in which the dynamic pattern is a frame-shaped pattern will be described with reference to FIGS. 4A and 4B. FIGS. 4A and 4B are explanatory diagrams for describing a frame-shaped pattern which is a specific example of the dynamic pattern.

Referring to FIG. 4A, a state in which a captured image is displayed on a display screen 410 is illustrated in the upper part and a state in which a moving image patterned image is displayed on the display screen 410 is illustrated in the lower part. That is, the display of the display screen 410 illustrated in the lower part shows a state in which a frame-shaped pattern which is a dynamic pattern is set on the display of the display screen 410 illustrated in the upper part.

Referring to FIG. 4A, in the captured image illustrated in the upper part, an approaching vehicle 420 which is an approaching object is displayed on the display screen 410. In addition, in the dynamically patterned image illustrated in the lower part, a frame-shaped pattern 520 is displayed to overlap the approaching vehicle 420. Thus, the dynamic pattern according to the present embodiment may be the frame-shaped pattern 520 in which a plurality of frames arranged concentrically are displayed, and the dynamically patterned image may be an image in which the pattern of concentric frames overlaps the approaching object. Also, the frame-shaped pattern 520 is displayed such that the frames forming the frame-shaped pattern 520 are displayed to be expanded using the center of the frames as the reference.

A state in which the display of the frame-shaped pattern 520 varies is illustrated in FIG. 4B. As illustrated in FIG. 4B, frame-shaped patterns 520*a*, 520*b*, and 520*c* may be displayed such that the frames forming the frame-shaped patterns 520*a*, 520*b*, and 520*c* are expanded at a predetermined speed. In the example illustrated in FIG. 4B, the frame-shaped pattern 520*b* shows a state in which the frames in the frame-shaped pattern 520*a* are expanded at a predetermined ratio. Likewise, the frame-shaped pattern 520*c* shows a state in which the frames in the frame-shaped pattern 520*b* are further expanded at a predetermined ratio. Also, the frame-shaped pattern 520*a* shows a state in which the frames in the frame-shaped pattern 520*c* are further expanded at a predetermined ratio, the display of the outermost frame disappears, and a new frame is displayed as the innermost frame. Thus, by varying the displays of the frame-shaped patterns 520*a*, 520*b*, and 520*c* so that the frames are expanded, the driver viewing the display screen 410 can intuitively recognize that the approaching vehicle 420 is approaching.

In the present embodiment, however, the variation in the display of the frame-shaped pattern 520 is not limited to this example, but the display of the frame-shaped pattern 520 may vary on the display screen 410 so that the display alerts the dynamic visual acuity of the driver, and a method of varying the display may be realized in any form. For example, in contrast to the example illustrated in FIG. 4B, the display of the frame-shaped pattern 520 may vary so that the frames are contracted concentrically.

Here, for example, since the frames forming the frame-shaped pattern 520 are colored translucently as in the above-described zebra pattern 510, the frame-shaped pattern 520 according to the present embodiment is configured such that a region overlapping the frames in the approaching vehicle 420 can be viewed by the driver. Accordingly, the driver who confirms the display screen 410 can view a state in which the frame-shaped pattern 520 moves on the approaching vehicle 420 and can view an image of the approaching vehicle 420 from the intervals between the frames and on the frames of the frame-shaped pattern 520. Thus, since the frame-shaped pattern 520 is generated so that the driver is not prevented from viewing the approaching vehicle 420, the driver can recognize the approaching vehicle 420 accurately.

(1-3-3. Wave-Shaped Pattern)

Next, a case in which the dynamic pattern is a wave-shaped pattern will be described with reference to FIGS. 5A to 5C. FIGS. 5A to 5C are explanatory diagrams for describing a wave-shaped pattern which is a specific example of the dynamic pattern.

Referring to FIG. 5A, a state in which a captured image is displayed on a display screen 410 is illustrated in the upper part and a state in which a moving image patterned image is displayed on the display screen 410 is illustrated in the lower part. That is, the display of the display screen 410 illustrated in the lower part shows a state in which a wave-shaped pattern which is a dynamic pattern is set on the display of the display screen 410 illustrated in the upper part.

Referring to FIG. 5A, in the captured image illustrated in the upper part, an approaching vehicle 420 which is an approaching object is displayed on the display screen 410. In addition, in the dynamically patterned image illustrated in the lower part, a wave-shaped pattern 530 set for the approaching vehicle 420 is displayed. Specifically, in the dynamically patterned image, the approaching vehicle 420 distorted in a wave shape is displayed. In the example illustrated in FIG. 5A, the approaching vehicle 420 distorted in the wave shape in a vertical direction is displayed. Thus, the dynamic pattern according to the present embodiment may be the wave-shaped pattern 530 of distortion of the image of the approaching object, in which the approaching vehicle 420 is distorted in the wave shape and displayed. Also, the wave-shaped pattern 530 is displayed so that the distortion of the wave shape is moved in a predetermined direction. Further, the dynamically patterned image in which the wave-shaped pattern 530 is set may be generated by distorting the approaching vehicle 420 and a region in the vicinity of the approaching vehicle 420 in a captured image or may be generated by providing a filter (a wave-shaped filter) which distorts and displays an operation target in a wave shape and operating the wave-shaped filter on the approaching vehicle 420 and the region in the vicinity of the approaching vehicle 420 in the captured image.

A state in which the display of the wave-shaped pattern 530 varies is illustrated in FIG. 5B. As illustrated in FIG. 5B, wave-shaped patterns 530a, 530b, and 530c may be moved at a predetermined speed in a right or left direction of the display screen 410. In the example illustrated in FIG. 5B, the wave-shaped pattern 530b shows a state in which the distortion of the wave shape in the wave-shaped pattern 530a is moved from the right to the left by a predetermined distance in the direction of a paper surface. Likewise, the wave-shaped pattern 530c shows a state in which the distortion of the wave shape in the wave-shaped pattern 530b is moved from the right to the left by the predetermined distance in the direction of the paper surface, and the wave-shaped pattern 530a shows a state in which the distortion of the wave shape in the wave-shaped pattern 530c is moved from the right to the left by the predetermined distance in the direction of the paper surface.

In the present embodiment, however, the variation in the display of the wave-shaped pattern 530 is not limited to this example, but the display of the wave-shaped pattern 530 may vary on the display screen 410 so that the display alerts the dynamic visual acuity of the driver, and a method of varying the display may be realized in any form. Also, in the example illustrated in FIGS. 5A and 5B, the approaching vehicle 420 is distorted in the vertical direction to be displayed, but the wave-shaped pattern 530 according to the present embodiment is not limited to this example. The approaching vehicle 420 may be distorted in another form to be displayed. For example, the approaching vehicle 420 may be distorted in the lateral direction to be displayed or may be distorted in a concentric ripple shape to be displayed using the vicinity of the center of the approaching vehicle 420 as the reference.

FIG. 5C illustrates, as one modification example of the wave-shaped pattern 530, a dynamically patterned image in which a wave-shaped pattern 540 which is a pattern displayed by distorting the approaching vehicle 420 in a lateral direction is set. Here, as in FIG. 5A, in FIG. 5C, a state in which a captured image is displayed on a display screen 410 is illustrated in the upper part and a state in which a moving image patterned image is displayed on the display screen 410 is illustrated in the lower part. As illustrated in FIG. 5C, when the dynamic pattern is the wave-shaped pattern 540 which is a pattern in which the approaching vehicle 420 is distorted in the lateral direction to be displayed, the display of the wave-shaped pattern 540 may vary, for example, so that the distortion of the wave shape is moved in the vertical direction. Also, when the dynamic pattern in the approaching vehicle 420 is a wave-shaped pattern distorted in a concentric ripple shape to be displayed using the vicinity of the center of the approaching vehicle 420 as the reference, the display of the wave-shaped pattern may vary, for example, so that the distortion of the wave shape is broadened or contracted concentrically.

Here, when the dynamic pattern is the wave-shaped pattern 530 or 540, the display of the approaching vehicle 420 is maintained so as to be visible so that the display of the approaching vehicle 420 on the display screen 410 is not hidden by a given pattern. Accordingly, the driver who confirms the display screen 410 can view the state in which the wave-shaped pattern 530 or 540 is moving on the approaching vehicle 420 and can directly view the display of the approaching vehicle 420. Thus, since the wave-shaped pattern 530 or 540 is generated so that the driver is not prevented from viewing the approaching vehicle 420, the driver can recognize the approaching vehicle 420 accurately.

The zebra pattern 510, the frame-shaped pattern 520, and the wave-shaped patterns 530 and 540 have been described in detail above as the specific examples of the dynamic pattern according to the present embodiment with reference to FIGS. 3A, 3B, 4A, 4B, and 5A to 5C. As described above, with the zebra pattern 510, the frame-shaped pattern 520, and the wave-shaped patterns 530 and 540, the attention of the driver can be called by varying the display on the display screen 410, and the display of the approaching vehicle 420 which is a target for which the dynamic pattern is set is maintained so as to be visible. Accordingly, the driver can recognize the approaching vehicle 420 more quickly and more accurately. Also, as described in the foregoing (1-2. Configuration of approaching object notification system), such dynamic patterns may be generated with different colors according to the degree of danger decided by the danger degree decision unit 333 or may be generated such that the display variation speeds are different.

Here, as another method of notifying the driver of an approaching object, for example, a method of painting a region corresponding to the approaching object in a captured image displayed on a monitor installed in a vehicle a predetermined color (for example, a warning color such as red) can be considered. However, since it is difficult for the driver to view an approaching object itself in the method of painting a region corresponding to the approaching object a predetermined color, information showing a state of the approaching object to be originally displayed on the monitor may disappear, and thus there is a concern that the driver may not sufficiently recognize the state of the approaching object and it is difficult for the driver to determine a situation quickly. On the other hand, as described above, in the dynamic pattern according to the present embodiment, the display of the approaching vehicle 420 which is a target for which the dynamic pattern is set is maintained so as to be visible. Accordingly, in the present embodiment, the driver can instantly recognize his or her surroundings including an approaching object more quickly and perform accurate situation determination and operation of his or her vehicle.

Here, the dynamic pattern according to the present embodiment is generated so that the display varies periodically on the display screen. However, in general, when human beings see a display varying due to phase driving of three or more phases, human beings can recognize that the display is moved in one direction. That is, to allow a driver to see that the display of a dynamic pattern varies, three patterns moved slightly in a predetermined direction may be generated and the patterns may be displayed in order. When this principle is used, the dynamic pattern according to the present embodiment may be generated such that the display varies by phase driving of at least three phases.

Also, the dynamic pattern according to the present embodiment is not limited to the zebra pattern 510, the frame-shaped pattern 520, and the wave-shaped patterns 530 and 540 described above, but may be other patterns. The dynamic pattern according to the present embodiment may be a pattern of which the display varies on the display screen to alert the dynamic visual acuity of the driver and which does not obstruct the viewing of an approaching object which is a target for which the dynamic pattern is set, and all kinds and forms of patterns can serve as the dynamic pattern. For example, the dynamic pattern may be a lattice-shaped pattern in which line segments with a predetermined width are arranged vertically and horizontally at predetermined intervals or may be a pattern in which the lattice is displayed so as to be moved in a predetermined direction. Also, the driver may select any dynamic pattern among a plurality of different dynamic patterns.

2. Second Embodiment

Next, an approaching object notification system according to a second embodiment of the present disclosure will be described with reference to FIG. 6. FIG. 6 is a functional block diagram illustrating one configuration example of the approaching object notification system according to the second embodiment of the present disclosure.

Referring to FIG. 6, an approaching object notification system 2 according to the second embodiment of the present disclosure includes a vehicle information detection device 10 and an approaching object notification device 30. Here, the approaching object notification system 2 according to the second embodiment of the present disclosure is the same as in the first embodiment described with reference to FIG. 2 except that the distance detection device 20 is not included and an approach information acquisition unit 332a is included instead of the approach information acquisition unit 332. Accordingly, in the following description of the second embodiment, differences from the first embodiment will be mainly described and the detailed description of the repeated function and configuration will be omitted.

The approach information acquisition unit 332a according to the second embodiment is different from the approach information acquisition unit 332 according to the first embodiment in a method of acquiring approach information. In the second embodiment, the approach information acquisition unit 332a acquires approach information based on image information regarding a captured image transmitted from the image information acquisition unit 335. In the captured image captured by the imaging unit 310, a state of the surroundings of a vehicle is photographed, and thus a nearby object (for example, another vehicle) is included. The approach information acquisition unit 332a can acquire approach information based on display of the nearby object included in the captured image. Thus, in the present embodiment, an approach state is determined based on the image information regarding the captured image acquired by the image information acquisition unit 335.

All of the known methods can be used as a specific method by which the approach information acquisition unit 332a acquires the approach information from the captured image. For example, the approach information acquisition unit 332a may acquire the fact that there is an approaching object and an approaching direction of the approaching object as the approach information by detecting a temporal change of a display area of an object in the captured image and using the fact that the display area increases as time passes. Also, the approach information acquisition unit 332a may detect a speed at which the object is approaching based on a ratio of the increase in the display areas with the elapse of the time. Thus, in some embodiments, determining whether to alert the vehicle occupant to proximity of the approaching object may include comparing images of the object captured over time, and calculating a degree of danger of the object based at least in part on changes between the compared images indicating an approach speed of the object.

Also, when the plurality of imaging units 310 are disposed in the vehicle and there are two or more captured images obtained by imaging the object at mutually different angles, the approach information acquisition unit 332a may acquire the approach information based on the plurality of captured images. When the plurality of captured images are used, for example, a distance (subject distance) to a subject (object) corresponding to pixels included in an overlap region in the plurality of captured images may be calculated by the principle of stereo distance measurement. The approach information acquisition unit 332a may acquire the fact that there is an approaching object and an approaching direction of the approaching object as the approach information by detecting a temporal change of the calculated subject distance and using the fact that the subject distance is closer with the elapse of time. Also, the approach information acquisition unit 332a may detect an approaching speed of the object based on a ratio at which the subject distance becomes closer with the elapse of time.

Also, the function of the approach information acquisition unit 332a according to the second embodiment is the same as the function of the approach information acquisition unit 332 described in the first embodiment except that the approach information is acquired based on the image information regarding the captured image. Accordingly, for example, the approach information acquisition unit 332a may frequently acquire the approach information based on the image information frequently transmitted from the image information acquisition unit 335 or may acquire the approach information at a predetermined timing. The predetermined timing may be, for example, a timing at which specific vehicle information is detected by the vehicle information detection device 10. Thus, in the present embodiment, the approach information acquisition unit 332a may receive the vehicle information from the vehicle information detection device 10 or may acquire the approach information when trigger information which is specific vehicle information is received. When the approach information acquisition unit 332a acquires the approach information according to the trigger information, the approach information acquisition unit 332a receiving the trigger information may detect the distance by transmitting an instruction to transmit the image information to the image information acquisition unit 335 so that the image information can be transmitted to the approach information acquisition unit 332a. Also, the vehicle information which can serve as the trigger information may be specifically the vehicle information described in the foregoing (1-2. Configuration of approaching object notification system).

The function and the configuration of the approaching object notification system 2 according to the second embodiment of the present disclosure have been described above with reference to FIG. 6. Also, in the approaching object notification system 2, the functions and the configurations of the constituent members other than the above-described approach information acquisition unit 332a are the same as those of the approaching object notification system 1 according to the first embodiment. For example, the zebra pattern 510, the frame-shaped pattern 520, and the wave-shaped patterns 530 and 540 described in the foregoing (1-3. Specific examples of dynamic patterns) may be used as dynamic patterns in the approaching object notification system 2. Also, as in the above-described first embodiment, in the second embodiment, the approaching object notification device 30 may have another configuration not illustrated in FIG. 6. Further, the approaching object notification device 30 according to the second embodiment may not be configured by a single device and functions of the approaching object notification device 30 may be configured to be distributed to any plurality of devices.

In the second embodiment of the present disclosure, as described above, the following advantages can be obtained in addition to the advantages obtained in the first embodiment. That is, in the second embodiment of the present disclosure, the approach information is acquired based on the captured image captured by the imaging unit 310. Accordingly, it is not necessary to install the distance detection device 20 in the vehicle, and thus the approaching object notification system can be configured at a lower cost.

3. Processing Order of Approaching Object Notification Method

Next, an exemplary approaching object notification method according to the first and second embodiments of the present disclosure will be described with reference to FIG. 7. FIG. 7 is a flowchart illustrating one exemplary approaching object notification method according to the first and second embodiments of the present disclosure. Also, in the following description of FIG. 7, since the functions of the vehicle information detection device 10, the distance detection device 20, and the approaching object notification device 30 are the same as the functions described in the foregoing <1. First embodiment> and <2. Second embodiment>, the detailed description thereof will be omitted.

Also, FIG. 7 illustrates an example in which the approach information acquisition units 332 and 332a acquire the approach information and perform the approaching object notification process when trigger information which is specific vehicle information is detected. In the example illustrated in FIG. 7, specifically, in the trigger information, a direction indicator of a vehicle is driven and a speed of the vehicle is equal to or greater than a predetermined threshold value. When such trigger information is detected, a situation in which the vehicle attempts to change traffic lanes while traveling at the speed equal to or greater than the predetermined speed is assumed. Therefore, this situation can be said to be a situation in which it is highly important to notify the driver of an approaching object (approaching vehicle), particularly, an approaching object in a traffic lane to which the vehicle will change.

Referring to FIG. 7, in step S701, the approach information acquisition units 332 and 332a first determine whether the vehicle executes traffic lane change based on vehicle information transmitted from the vehicle information detection device 10. Here, the approach information acquisition units 332 and 332a may determine whether the vehicle executes the traffic lane change according to whether the vehicle information includes information indicating that the direction indicator is driven.

When it is determined that the vehicle does not execute the traffic lane change, the approaching object notification process is interrupted and the approach information acquisition units 332 and 332a wait until subsequent vehicle information is transmitted. The determination of step S701 is repeatedly performed on the subsequent vehicle information. When it is determined that the vehicle executes the traffic lane change, the process proceeds to step S703.

In step S703, the approach information acquisition units 332 and 332a determine whether the speed of the vehicle is equal to or greater than a predetermined threshold value based on the vehicle information transmitted from the vehicle information detection device 10. Here, the approach information acquisition units 332 and 332a may perform the determination based on information regarding the speed of the vehicle included in the vehicle information. For example, the threshold value is set to a speed at the time of high-speed traveling for which danger of collision with a nearby object is considered to increase. However, the threshold value is not limited to this example, but may be set appropriately by the driver or a designer of the approaching object notification system.

When it is determined that the speed of the vehicle is less than the threshold value, the process returns to step S701.

That is, the approaching object notification process is interrupted and the approach information acquisition units 332 and 332*a* wait until subsequent vehicle information is transmitted. When it is determined that the speed of the vehicle is equal to or greater than the threshold value, the process proceeds to step S705.

In step S705, the approach state determination unit 331 determines whether there is an approaching vehicle which is an approaching object. Here, as described in the foregoing <1. First embodiment> and <2. Second embodiment>, in the first embodiment, the approach information acquisition unit 332 may acquire the approach information based on information regarding a distance between the vehicle and a nearby object detected by the distance detection device 20 or the approach state determination unit 331 may determine whether there is an approaching vehicle based on approach information acquired by the approach information acquisition unit 332. Also, in the second embodiment, the approach information acquisition unit 332*a* may acquire the approach information based on the image information regarding the captured image transmitted from the image information acquisition unit 335 or the approach state determination unit 331 may determine whether there is an approaching vehicle based on the approach information acquired by the approach information acquisition unit 332*a*.

When it is determined that there is no approaching vehicle, the process returns to step S701. That is, the approaching object notification process is interrupted and the approach information acquisition units 332 and 332*a* wait until new vehicle information is transmitted. When it is determined that there is an approaching vehicle, the process proceeds to step S707.

In step S707, the dynamic pattern generation unit 334 generates a dynamic pattern based on an approach state determined by the approach state determination unit 331. Here, the approach state may include the approach information acquired by the approach information acquisition units 332 and 332*a* and the information regarding the degree of danger of the approaching object decided by the danger degree decision unit 333. Also, the dynamic pattern generation unit 334 may adjust a variation speed of the display of the dynamic pattern, the color of the dynamic pattern, or the like according to the approach state of the approaching object, particularly, the degree of danger. For example, when it is determined that the degree of danger is high, for example, the speed of the approaching object is high or the distance between the vehicle and the approaching object is small, the dynamic pattern generation unit 334 may increase the variation speed of the display of the dynamic pattern or set the color of the dynamic pattern to be red or the like in order to call the attention of the driver more strongly. When the dynamic pattern is generated in step S707, the process proceeds to step S709.

In step S709, the image generation unit 336 generates a dynamically patterned image based on the approach state determined by the approach state determination unit 331. Here, the image generation unit 336 may generate the dynamically patterned image by setting the dynamic pattern generated in step S707 by the dynamic pattern generation unit 334 on the display of the approaching object of the captured image based on the image information regarding the captured image acquired by the image information acquisition unit 335. When the dynamically patterned image is generated in step S709, the process proceeds to step S711.

In step S711, the display control unit 337 displays the dynamically patterned image on the display screen of the display unit 120. Even when the driver is paying attention to another portion, the driver can recognize that something is moving on the display screen due to the variation in the dynamic pattern displayed on the display screen of the display unit 120, and therefore the driver can recognize the presence of the approaching vehicle quickly. Also, since the dynamic pattern is generated not to obstruct the viewing of the approaching vehicle for which the dynamic pattern is set, the driver can confirm the type, color, or the like of the approaching vehicle by confirming the dynamically patterned image displayed on the display screen when the approaching object is a vehicle, and thus the driver can recognize the approaching object more accurately.

In the approaching object notification method according to the first and second embodiments, the processes from step S701 to step S711 described above are repeated to notify the driver of the approaching object. Also, when it is determined that the danger has been avoided, for example, by the driver taking appropriate measures with reference to the dynamically patterned image displayed on the display screen of the display unit 120, or when the distance between the vehicle and the approaching object becomes a sufficiently safe distance, the series of the approaching object notification process ends, and a series of processes from the process of step S701 may be performed again.

The processing order of the approaching object notification method according to the first and second embodiments of the present disclosure has been described above with reference to FIG. 7. In the example illustrated in FIG. 7, when the trigger information which is specific vehicle information is detected, the approach information acquisition units 332 and 332*a* acquire the approach information and perform the approaching object notification process, but the present embodiment is not limited to this example. In the present embodiment, the approach information acquisition units 332 and 332*a* may frequently acquire the approach information and frequently perform the approaching object notification process. Also, in the example illustrated in FIG. 7, as described in steps S701 and step S703, the example in which the direction indicator of the vehicle is driven and the speed of the vehicle is equal to or greater than the predetermined threshold value in the trigger information has been described, but the present embodiment is not limited to the example. In the present embodiment, various kinds of information included in the vehicle information as the trigger information may be appropriately combined to be used.

4. Hardware Configuration

Next, a hardware configuration of the approaching object notification device 30 according to an embodiment of the present disclosure will be described in detail with reference to FIG. 8. FIG. 8 is a functional block diagram illustrating one configuration example of the hardware configuration of the approaching object notification device according to the first and second embodiments of the present disclosure.

The approaching object notification device 30 mainly includes at least one processor, such as a CPU 901, and at least one processor-readable storage medium such as a ROM 903 and/or a RAM 905. Also, the approaching object notification device 30 further includes a host bus 907, a bridge 909, an external bus 911, an interface 913, an imaging device 914, an input device 915, an output device 917, a storage device 919, a drive 921, a connection port 923, and a communication device 925.

The CPU 901 functions as an arithmetic processing device and a control device and controls all or some of the operations in the approaching object notification device 30 according to various programs (i.e., processor-executable instructions) recorded in the ROM 903, the RAM 905, the storage device 919, or a removable recording medium 927. The CPU 901 corresponds to, for example, the control unit 330 illustrated in FIGS. 2 and 6 in the first and second embodiments. The ROM 903 stores a program, an arithmetic parameter, and the like used by the CPU 901. The RAM 905 primarily stores a program used by the CPU 901 and a parameter or the like appropriately changed in execution of the program. These units are connected to each other by the host bus 907 configured by an internal bus such as a CPU bus.

The host bus 907 is connected to the external bus 911 such as a Peripheral Component Interconnect/interface (PCI) bus via the bridge 909.

The imaging device (image-capturing device) 914 is a device configured to include a plurality of light-receiving elements (photoelectric conversion elements) installed in an array form and acquire an image signal which is an electric signal indicating an image by converting a received optical signal into the electric signal. A captured image can be obtained by performing various kinds of signal processing on the image signal acquired by the imaging device 914 and displaying the result on a display device such as a display. The imaging device 914 may include, for example, various camera devices including various solid-state imaging elements such as a charge coupled device (CCD) and a complementary metal oxide semiconductor (CMOS). The imaging device 914 corresponds to, for example, the imaging unit 310 illustrated in FIGS. 2 and 6 in the first and second embodiments and a mounted function of imaging a state of the surroundings of a vehicle.

The input device 915 is, for example, an operation unit operated by a user, such as a mouse, a keyboard, a touch panel, a button, a switch, and a lever. Also, the input device 915 may be, for example, a remote control unit (so-called remote controller) using infrared rays or other radio waves or may be, for example, an external connection device 929 such as a mobile phone or a PDA corresponding to an operation of the approaching object notification device 30. Also, the input device 915 includes, for example, an input control circuit that generates an input signal based on information which a user inputs using the foregoing operation unit, and outputs the input signal to the CPU 901. The user (driver) of the approaching object notification device 30 can input various kinds of data to the approaching object notification device 30 or instruct a processing operation by operating the input device 915. For example, in the first and second embodiments, the driver may operate the input device 915 to input various conditions in the approaching object notification process, such as trigger information serving as a trigger of acquisition of the approach information by the approach information acquisition unit 332, a danger degree decision scheme by the danger degree decision unit 333, and a type of dynamic pattern to be used.

The output device 917 includes a device capable of visually or auditorily notifying the user of the acquired information. Examples of the output device include a CRT display device, a liquid crystal display device, a plasma display device, an EL display device such as an organic LED, display devices such as a head-up display (HUD) and a lamp, an audio output device such as a speaker or a headphone, various human machine interfaces of vibration (haptics) systems such as seat vibration and steering vibration, and a printer device. For example, the output device 917 outputs results obtained through various processes performed by the approaching object notification device 30. Specifically, the display device displays results obtained through various processes performed by the approaching object notification device 30 as text or images. The display device corresponds to, for example, the display unit 320 illustrated in FIGS. 2 and 6 in the first and second embodiments. Also, the audio output device converts an audio signal coming from reproduced audio data, acoustic data, or the like into an analog signal and outputs the analog signal.

The storage device 919 is a data storage device configured as an example of the storage unit of the approaching object notification device 30. The storage device 919 includes, for example, a magnetic storage device such as a hard disk drive (HDD), a semiconductor storage device, an optical storage device, or a magneto-optical storage device. The storage device 919 stores a program executed by the CPU 901 or various kinds of data and various kinds of data acquired from the outside. For example, in the first and second embodiments, the storage device 919 stores various kinds of information processed in the approaching object notification process. For example, the storage device 919 may store various kinds of information such as the acquired vehicle information, the acquired approach information, the decided degree of danger, the captured image obtained through imaging, the generated dynamic pattern, and the generated dynamically patterned image chronologically as a history.

The drive 921 is a recording medium reader and writer and is built in the approaching object notification device 30 or is attached on the outside thereof. The drive 921 reads information recorded on the mounted removable recording medium 927 such as a magnetic disk, an optical disc, a magneto-optical disc, or a semiconductor memory and outputs the information to the RAM 905. Also, the drive 921 can write a record on the mounted removable recording medium 927 such as a magnetic disk, an optical disc, a magneto-optical disc, or a semiconductor memory. Examples of the removable recording medium 927 include DVD media, HD-DVD media, and Blu-ray (registered trademark) media. Also, examples of the removable recording medium 927 include CompactFlash (CF; registered trademark), a flash memory, and a Secure Digital memory card (SD memory card). Also, examples of the removable recording medium 927 include an integrated circuit (IC) card on which a contactless IC chip is mounted and an electronic device. For example, in the first and second embodiments, the drive 921 may read various kinds of information processed in the approaching object notification process from the various removable recording media 927 or may write various kinds of information on the various removable recording media 927.

The connection port 923 is a port configured to directly connect a device to the approaching object notification device 30. Examples of the connection port 923 include a Universal Asynchronous Receiver Transmitter (UART), an Inter-Integrated Circuit (I2C), a Universal Serial Bus (USB) port, an IEEE1394 port, and a Small Computer System Interface (SCSI) port. Other examples of the connection port 923 include an RS-232C port, an optical audio terminal, and a High-Definition Multimedia Interface (HDMI) (registered trademark) port. When the external connection device 929 is connected to the connection port 923, the approaching object notification device 30 directly acquires various kinds of data from the external connection device 929 or provides various kinds of data to the external connection device 929. For example, in the first and second embodiments, various kinds of information processed in the approaching object notification process may be read from the various external connection devices 929 or may be written on the various external connection devices 929 via the connection port 923.

The communication device 925 is, for example, a communication interface including a communication device connected to a communication network (network) 931. Examples of the communication device 925 include communication cards for a controller area network (CAN), a Local Interconnect Network (LIN), FlexRay, Media Oriented Systems Transport (MOST), a Domestic Digital Bus (D2B), Ethernet (registered trademark) AVB (IEEE 802.1 Audio/Video Bridging), a wired or wireless local area network (LAN), Bluetooth (registered trademark), and a Wireless USB (WUSB). Also, the communication device 925 may be a router for optical communication, a router for an asymmetric digital subscriber line (ADSL), or modems for various kinds of communication. For example, the communication device 925 can transmit and receive a signal or the like to and from the Internet or another communication device in conformity with a predetermined protocol such as TCP/IP. Also, the communication network 931 connected to the communication device 925 may include networks connected in a wired or wireless manner and may be, for example, the Internet, a household LAN, infrared ray communication, radio-wave communication, or satellite communication. For example, in the first and second embodiments, the communication device 925 may transmit and receive various kinds of information processed in the approaching object notification process to and from another external device via the communication network 931.

The hardware configuration capable of realizing the functions of the approaching object notification device 30 according to the embodiments of the present disclosure has been described above. Each of the foregoing constituent elements may be configured using a general-purpose member or may be configured by hardware specialized for the function of the constituent element. Accordingly, the hardware configuration to be used can be modified appropriately according to a technical level at the time of realizing the present embodiments.

Also, a computer program executed to realize each function of the approaching object notification device 30 according to the above-described present embodiments may be produced and mounted on a personal computer or the like. Also, a computer-readable recording medium storing such a computer program can be provided. Examples of the recording medium include a magnetic disk, an optical disc, a magneto-optical disc, and a flash memory. Also, the foregoing computer program may be delivered via, for example, a network without using a recording medium.

In this respect, it should be appreciated that one implementation of some embodiments comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a program (i.e., a plurality of instructions), which, when executed on one or more processors, performs above-discussed functions of embodiments of the present invention. The processor-readable storage medium can be transportable such that the program stored thereon can be loaded onto any computer resource to implement functionality discussed herein. In addition, it should be appreciated that the reference to a program which, when executed, performs above-discussed functions, is not limited to an application program running on a host computer. Rather, the term "program" is used herein in a generic sense to reference any type of computer code (e.g., software or microcode) that can be employed to program one or more processors to implement above-discussed functionality.

5. Conclusion

In the first and second embodiments of the present disclosure described above, the following advantages can be obtained.

In the first embodiment, the dynamic pattern generation unit 334 generates the dynamic pattern of which the display varies at the predetermined period on the display screen of the display unit 320. Also, the image generation unit 336 generates the dynamically patterned image that is an image in which a dynamic pattern is set for an approaching object in a captured image and that is an image in which the approaching object and the dynamic pattern are displayed together. Further, the display control unit 337 displays the dynamically patterned image on the display screen of the display unit 320. Accordingly, since the dynamic pattern varies at the predetermined period on the display screen, the driver can understand that the variation occurs on the display screen in the field of view, and thus can quickly recognize that there is an approaching object. Also, since the viewing of the approaching object for which the dynamic pattern is set is not obstructed, the driver can recognize the relative speed, size, or the like of the approaching object accurately. Accordingly, in the first embodiment, the driver can be notified of the approaching object more quickly and more accurately.

In the second embodiment, the following advantages can be obtained in addition to the advantages obtained in the first embodiment. That is, in the second embodiment of the present disclosure, the approach information is acquired based on the captured image captured by the imaging unit 310. Accordingly, it is not necessary to install the distance detection device 20 in the vehicle and the approaching object notification system can be configured at a lower cost.

The preferred embodiments of the present disclosure have been described above in detail with reference to the appended drawings, but the technical scope of the present disclosure is not limited to these examples. It should be apparent to those skilled in the art of the present disclosure that various modification examples and variation examples can be made within the scope of the technical spirit and essence described in the claim, and the modification examples and the variation examples are, of course, construed to pertain to the technical scope of the present disclosure.

For example, the information regarding the speed of the vehicle, the information regarding the driving of the direction indicator of the vehicle, and the information regarding the position of the shift lever have been described above as specific examples of the vehicle information used in the acquisition of the approach information by the approach information acquisition unit 332 and the decision of the degree of danger by the danger degree decision unit 333. However, embodiments of the present disclosure are not limited to these examples. For example, the vehicle information may include various kinds of information processed by a car navigation system mounted on a vehicle. Also, for example, the approach information acquisition unit 332 and the danger degree decision unit 333 may perform acquisition of the approach information and decision of the degree of danger according to a road situation or the like based on Vehicle Information and Communication System (VICS) (registered trademark) information acquired by a car navigation system. Also, for example, the approach information acquisition unit 332 and the danger degree decision unit 333 may perform acquisition of the approach information and decision of the degree of danger according to surroundings (darkness, rainfall, fog, or the like) based on information regarding a lighting state of a head lamp included in the vehicle information or information regarding a driving state of a wiper.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Additionally, the present technology may also be configured as below.

(1)
An information processing device including:
an image information acquisition unit configured to acquire image information regarding a captured image including at least an approaching object;
an image generation unit configured to generate a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object; and
a display control unit configured to display the dynamically patterned image on the display screen.

(2)
The information processing device according to (1), wherein the approach state includes approach information that is information regarding the approaching object and danger degree information that is information regarding a degree of danger of the object decided based on the approach information, and
wherein the dynamic pattern is generated based on the decided degree of danger.

(3)
The information processing device according to (2), wherein the dynamic patterns are generated such that the dynamic patterns have different colors according to the decided degrees of danger.

(4)
The information processing device according to (2) or (3), wherein the dynamic patterns are generated such that a display variation speed varies according to the decided degree of danger (5)
The information processing device according to any one of (1) to (4),
wherein the dynamic pattern is a zebra pattern in which line segments with a predetermined width are arranged at predetermined intervals and the line segments are displayed so as to be moved, and
wherein the dynamically patterned image is an image in which the zebra pattern overlaps the object.

(6)
The information processing device according to any one of (1) to (4),
wherein the dynamic pattern is a frame-shaped pattern displayed so that a plurality of frames arranged concentrically are expanded using a center of each frame as a reference, and
wherein the dynamically patterned image is an image in which the frame-shaped pattern overlaps the object.

(7)
The information processing device according to any one of (1) to (4), wherein the dynamic pattern is a wave-shaped pattern displayed so that the object is distorted in a wave shape and displayed so that the distortion of the wave shape is moved in a predetermined direction.

(8)
The information processing device according to any one of (1) to (7), wherein the display of the dynamic pattern varies by phase driving of at least three phases.

(9)
The information processing device according to any one of (1) to (8),
wherein the approach state includes approach information which is information regarding the object approaching a vehicle, and
wherein the approach information is acquired when specific vehicle information is detected as vehicle information indicating a state of the vehicle.

(10)
The information processing device according to any one of (1) to (9),
wherein the approach state includes approach information that is information regarding the object approaching a vehicle and danger degree information that is information regarding a degree of danger of the object decided based on the approach information, and
wherein the degree of danger is decided further based on vehicle information indicating the state of the vehicle.

(11)
The information processing device according to (9) or (10), wherein the vehicle information includes information regarding a speed of the vehicle.

(12)
The information processing device according to any one of (9) to (11), wherein the vehicle information includes information regarding driving of a direction indicator of the vehicle.

(13)
The information processing device according to any one of (9) to (12), wherein the vehicle information includes information regarding a position of a shift lever of the vehicle.

(14)
The information processing device according to any one of (9) to (13), wherein the vehicle information includes information regarding a state of a line of sight of a driver of the vehicle.

(15)
The information processing device according to any one of (1) to (14), wherein the approach state is determined based on information regarding a distance from the object detected by a distance detection device detecting the distance from the nearby object.

(16)
The information processing device according to (15), wherein the distance detection device includes a millimeter-wave radar device.

(17)
The information processing device according to any one of (1) to (14), wherein the approach state is determined based on the image information regarding the captured image acquired by the image information acquisition unit.

(18)
The information processing device according to (17), further including:
an imaging unit configured to capture the captured image including at least the nearby object.

(19)
An approaching object notification method including:
acquiring image information regarding a captured image including at least an approaching object;
generating a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object; and displaying the dynamically patterned image on the display screen.

(20)
A program causing a computer to perform:
a function of acquiring image information regarding a captured image including at least an approaching object;
a function of generating a dynamically patterned image that is an image in which a dynamic pattern of which display varies at a predetermined period on a display screen is set for the approaching object in the captured image and that is an image in which the approaching object and the dynamic pattern are displayed together, based on a determination result of an approach state which is a state of the approaching object; and a function of displaying the dynamically patterned image on the display screen.

(21)
A system comprising:
at least one image capturing device configured to capture an image of an object from a vehicle;
at least one display device configured to display the image of the object to an occupant of the vehicle; and
at least one control unit configured to:
determine whether to alert the occupant to proximity of the object, and
in response to determining to alert the occupant to proximity of the object, superimpose, on the image of the object for display on the at least one display device, a moving pattern through which the image of the object remains visible.

(22)
The system of (21), wherein the at least one control unit is configured to determine whether to alert the occupant to proximity of the object based at least in part on whether the vehicle's speed is greater than a threshold speed.

(23)
The system of (21) or (22), wherein the at least one control unit is configured to determine whether to alert the occupant to proximity of the object based at least in part on whether a direction indicator in the vehicle is activated.

(24)
The system of any of (21)-(23), wherein the at least one control unit is configured to determine whether to alert the occupant to proximity of the object based at least in part on whether the vehicle is in reverse.

(25)
The system of any of (21)-(24), wherein the at least one control unit is configured to determine whether to alert the occupant to proximity of the object based at least in part on head motion of a driver of the vehicle.

(26)
The system of any of (21)-(25), wherein determining whether to alert the occupant to proximity of the object comprises calculating a degree of danger of the object based at least in part on a distance between the vehicle and the object.

(27)
The system of any of (21)-(25), wherein determining whether to alert the occupant to proximity of the object comprises comparing images of the object captured over time,
and calculating a degree of danger of the object based at least in part on changes between the compared images indicating an approach speed of the object.

(28)
The system of (26) or (27), wherein the at least one control unit is further configured to increase a display variation speed of the moving pattern as the degree of danger increases.

(29)
The system of any of (21)-(28), wherein the moving pattern is a zebra pattern.

(30)
The system of any of (21)-(28), wherein the moving pattern is a pattern of concentric frames.

(31)
The system of any of (21)-(28), wherein the moving pattern is a wave-shaped pattern of distortion of the image of the object.

(32)
The system of any of (21)-(28), wherein the moving pattern is a lattice-shaped pattern.

(33)
A system comprising:
at least one processor; and
at least one processor-readable storage medium storing processor-executable instructions that, when executed by the at least one processor, cause the at least one processor to:
receive an image of an object captured by at least one image capturing device on a vehicle;
determine whether to alert an occupant of the vehicle to proximity of the object; in response to determining to alert the occupant to proximity of the object, superimpose on the image of the object a moving pattern through which the image of the object remains visible; and
provide the image of the object with the superimposed moving pattern to at least one display device for display to the occupant of the vehicle.

(34)
The system of (33), wherein the instructions cause the at least one processor to determine whether to alert the occupant to proximity of the object based at least in part on whether the vehicle's speed is greater than a threshold speed.

(35)
The system of (33) or (34), wherein the instructions cause the at least one processor to determine whether to alert the occupant to proximity of the object based at least in part on whether a direction indicator in the vehicle is activated.

(36)
The system of any of (33)-(35), wherein the instructions cause the at least one processor to determine whether to alert the occupant to proximity of the object based at least in part on whether the vehicle is in reverse.

(37)
The system of any of (33)-(36), wherein the instructions cause the at least one processor to determine whether to alert the occupant to proximity of the object based at least in part on head motion of a driver of the vehicle.

(38)
The system of any of (33)-(37), wherein determining whether to alert the occupant to proximity of the object comprises calculating a degree of danger of the object based at least in part on a distance between the vehicle and the object.

(39)
The system of any of (33)-(37), wherein determining whether to alert the occupant to proximity of the object comprises comparing images of the object captured over time,
and calculating a degree of danger of the object based at least in part on changes between the compared images indicating an approach speed of the object.

(40)
The system of (38) or (39), wherein the instructions further cause the at least one processor to increase a display variation speed of the moving pattern as the degree of danger increases.

(41)
The system of any of (33)-(40), wherein the moving pattern is a zebra pattern.

(42)
The system of any of (33)-(40), wherein the moving pattern is a pattern of concentric frames.

(43)
The system of any of (33)-(40), wherein the moving pattern is a wave-shaped pattern of distortion of the image of the object.

(44)
The system of any of (33)-(40), wherein the moving pattern is a lattice-shaped pattern.

(45)
A method comprising:
accessing an image of an object captured by at least one image capturing device on a vehicle;
determining whether to alert an occupant of the vehicle to proximity of the object; in response to determining to alert the occupant to proximity of the object, superimposing on the image of the object a moving pattern through which the image of the object remains visible; and
displaying the image of the object with the superimposed moving pattern to the occupant of the vehicle on at least one display device.

(46)
The method of (45), wherein the determination of whether to alert the occupant to proximity of the object is made based at least in part on whether the vehicle's speed is greater than a threshold speed.

(47)
The method of (45) or (46), wherein the determination of whether to alert the occupant to proximity of the object is made based at least in part on whether a direction indicator in the vehicle is activated.

(48)
The method of any of (45)-(47), wherein the determination of whether to alert the occupant to proximity of the object is made based at least in part on whether the vehicle is in reverse.

(49)
The method of any of (45)-(48), wherein the determination of whether to alert the occupant to proximity of the object is made based at least in part on head motion of a driver of the vehicle.

(50)
The method of any of (45)-(49), wherein determining whether to alert the occupant to proximity of the object comprises calculating a degree of danger of the object based at least in part on a distance between the vehicle and the object.

(51)
The method of any of (45)-(49), wherein determining whether to alert the occupant to proximity of the object comprises comparing images of the object captured over time,
and calculating a degree of danger of the object based at least in part on changes between the compared images indicating an approach speed of the object.

(52)
The method of (50) or (51), further comprising increasing a display variation speed of the moving pattern as the degree of danger increases.

(53)
The method of any of (45)-(52), wherein the moving pattern is a zebra pattern.

(54)
The method of any of (45)-(52), wherein the moving pattern is a pattern of concentric frames.

(55)
The method of any of (45)-(52), wherein the moving pattern is a wave-shaped pattern of distortion of the image of the object.

(56)
The method of any of (45)-(52), wherein the moving pattern is a lattice-shaped pattern.

(57)
At least one processor-readable storage medium storing processor-executable instructions that, when executed, perform the method of any of (45)-(56).

REFERENCE SIGNS LIST 1, 2 approaching object notification system
10 vehicle information detection device
20 distance detection device
30 approaching object notification device
310 imaging unit
320 display unit
330 control unit
331 approach state determination unit
332 approach information acquisition unit
333 danger degree decision unit
334 dynamic pattern generation unit
335 image information acquisition unit
336 image generation unit
337 display control unit

The invention claimed is:
1. A system for a vehicle, the system comprising:
at least one control unit configured to:
receive an image of an individual object captured by at least one image capturing device on the vehicle,
determine whether to alert the occupant to proximity of the individual object,
in response to determining to alert the occupant to proximity of the individual object, superimpose, on an image area indicating the individual object for display on the at least one display device, at least three different moving patterns in a time sequence through which the image of the individual object remains visible, and provide the image of the individual object with the superimposed at least three different moving patterns in the time sequence to the at least one display device for display to the occupant of the vehicle.

2. The system of claim 1, wherein the at least one control unit is configured to determine whether to alert the occupant to proximity of the individual object based at least in part on at least one factor selected from the group consisting of:
whether the vehicle's speed is greater than a threshold speed,
whether a direction indicator in the vehicle is activated,
whether the vehicle is in reverse, and
head motion of a driver of the vehicle.

3. The system of claim 1, wherein determining whether to alert the occupant to proximity of the individual object comprises calculating a degree of danger of the individual object based at least in part on (a) a distance between the vehicle and the individual object, and/or (b) changes between compared images of the individual object captured over time indicating an approach speed of the individual object.

4. The system of claim 3, wherein the at least one control unit is further configured to increase a display variation speed of the at least three different moving patterns as the degree of danger increases.

5. The system of claim 1, wherein the at least three different moving patterns include patterns selected from the group consisting of:
a zebra pattern,
a pattern of concentric frames,
a wave-shaped pattern of distortion of the image of the individual object, and
a lattice-shaped pattern.

6. The system of claim 1, further comprising:
the at least one display device configured to display images to the occupant of the vehicle.

7. A system comprising:
at least one processor; and
at least one non-transitory processor-readable storage medium storing processor-executable instructions that, when executed by the at least one processor, cause the at least one processor to:
receive an image of an individual object captured by at least one image capturing device on a vehicle;
determine whether to alert an occupant of the vehicle to proximity of the individual object;
in response to determining to alert the occupant to proximity of the individual object, superimpose, on an image area indicating the individual object, at least three different moving patterns in a time sequence through which the image of the individual object remains visible; and
provide the image of the individual object with the superimposed at least three different moving patterns in the time sequence to at least one display device for display to the occupant of the vehicle.

8. The system of claim 7, wherein the instructions cause the at least one processor to determine whether to alert the occupant to proximity of the individual object based at least in part on at least one factor selected from the group consisting of:
whether the vehicle's speed is greater than a threshold speed,
whether a direction indicator in the vehicle is activated,
whether the vehicle is in reverse, and
head motion of a driver of the vehicle.

9. The system of claim 7, wherein determining whether to alert the occupant to proximity of the individual object comprises calculating a degree of danger of the individual object based at least in part on (a) a distance between the vehicle and the individual object, and/or (b) changes between compared images of the individual object captured over time indicating an approach speed of the individual object.

10. The system of claim 9, wherein the instructions further cause the at least one processor to increase a display variation speed of the at least three different moving patterns as the degree of danger increases.

11. The system of claim 7, wherein the at least three different moving patterns include patterns selected from the group consisting of:
a zebra pattern,
a pattern of concentric frames,
a wave-shaped pattern of distortion of the image of the individual object, and
a lattice-shaped pattern.

12. A method comprising:
accessing an image of an individual object captured by at least one image capturing device on a vehicle;
determining whether to alert an occupant of the vehicle to proximity of the individual object;
in response to determining to alert the occupant to proximity of the individual object, superimposing, on an image area indicating the individual object, at least three different moving patterns in a time sequence through which the image of the individual object remains visible; and
providing the image of the individual object with the superimposed at least three different moving patterns in the time sequence to at least one display device for display to the occupant of the vehicle.

13. The method of claim 12, wherein the determination of whether to alert the occupant to proximity of the individual object is made based at least in part on at least one factor selected from the group consisting of:
whether the vehicle's speed is greater than a threshold speed,
whether a direction indicator in the vehicle is activated,
whether the vehicle is in reverse, and
head motion of a driver of the vehicle.

14. The method of claim 12, wherein determining whether to alert the occupant to proximity of the individual object comprises calculating a degree of danger of the individual object based at least in part on (a) a distance between the vehicle and the individual object, and/or (b) changes between compared images of the individual object captured over time indicating an approach speed of the individual object.

15. The method of claim 14, further comprising increasing a display variation speed of the at least three different moving patterns as the degree of danger increases.

16. The method of claim 12, wherein the at least three different moving patterns include patterns selected from the group consisting of:

a zebra pattern, a pattern of concentric frames, a wave-shaped pattern of distortion of the image of the individual object, and a lattice-shaped pattern.

17. At least one non-transitory processor-readable storage medium storing processor-executable instructions that, when executed, perform a method comprising:

accessing an image of an individual object captured by at least one image capturing device on a vehicle;

determining whether to alert an occupant of the vehicle to proximity of the individual object;

in response to determining to alert the occupant to proximity of the individual object, superimposing, on an image area indicating the individual object, at least three different moving patterns in a time sequence through which the image of the individual object remains visible; and providing the image of the individual object with the superimposed at least three different moving patterns in the time sequence to at least one display device for display to the occupant of the vehicle.

18. The at least one processor-readable storage medium of claim 17, wherein the determination of whether to alert the occupant to proximity of the individual object is made based at least in part on at least one factor selected from the group consisting of:

whether the vehicle's speed is greater than a threshold speed, whether a direction indicator in the vehicle is activated, whether the vehicle is in reverse, and head motion of a driver of the vehicle.

19. The at least one processor-readable storage medium of claim 17, wherein determining whether to alert the occupant to proximity of the individual object comprises calculating a degree of danger of the individual object based at least in part on (a) a distance between the vehicle and the individual object, and/or (b) changes between compared images of the individual object captured over time indicating an approach speed of the individual object.

20. The at least one processor-readable storage medium of claim 19, wherein the method further comprises increasing a display variation speed of the at least three different moving patterns as the degree of danger increases.

21. The at least one processor-readable storage medium of claim 17, wherein the at least three different moving patterns include patterns selected from the group consisting of:

a zebra pattern, a pattern of concentric frames, a wave-shaped pattern of distortion of the image of the individual object, and a lattice-shaped pattern.

22. An apparatus for a vehicle, the apparatus comprising:

a receiving section configured to receive an image of an individual object captured by at least one image capturing device on the vehicle, a determining section configured to determine whether to alert an occupant of the vehicle to proximity of the individual object, a superimposing section configured to, in response to determining to alert the occupant to proximity of the individual object, superimpose, on an image area indicating the individual object for display on at least one display device, at least three different moving patterns in a time sequence through which the image of the individual object remains visible, and an outputting section configured to provide the image of the individual object with the superimposed at least three different moving patterns in the time sequence to the at least one display device for display to the occupant of the vehicle.

* * * * *